US008181521B2

United States Patent
Arakawa et al.

(10) Patent No.: US 8,181,521 B2
(45) Date of Patent: May 22, 2012

(54) YAW RATE SENSOR USING SURFACE ACOUSTIC WAVE

(75) Inventors: Kazuki Arakawa, Nisshin (JP); Kazuhiko Kano, Toyoake (JP); Akihiko Teshigahara, Nisshin (JP)

(73) Assignee: DENSO CORPORATION, Kariya (*) Notice: Subject to any disclaimer, the term of this patent is extended or adjusted under 35 U.S.C. 154(b) by 774 days.

(21) Appl. No.: 12/292,709

(22) Filed: Nov. 25, 2008

(65) Prior Publication Data

US 2009/0133495 A1    May 28, 2009

(30) Foreign Application Priority Data

Nov. 28, 2007   (JP) ................. 2007-307749

(51) Int. Cl.
*G01P 3/00* (2006.01)
(52) U.S. Cl. .................................. 73/504.01
(58) Field of Classification Search ...... 73/503.3–504.04
See application file for complete search history.

(56) References Cited

U.S. PATENT DOCUMENTS

| | | | |
|---|---|---|---|
| 5,948,982 A * | 9/1999 | Woodruff et al. | 73/514.29 |
| 6,067,858 A * | 5/2000 | Clark et al. | 73/504.16 |
| 6,516,665 B1 | 2/2003 | Varadan et al. | |
| 6,984,332 B2 | 1/2006 | Varadan et al. | |
| 7,900,512 B2 * | 3/2011 | Kano et al. | 73/504.01 |

FOREIGN PATENT DOCUMENTS

| | | |
|---|---|---|
| JP | A-62-162915 | 7/1987 |
| JP | A-08-334330 | 12/1996 |
| JP | H08-334330 | 12/1996 |
| JP | A-10-332380 | 12/1998 |
| JP | A-2006-041692 | 2/2006 |

* cited by examiner

*Primary Examiner* — Max Noori
(74) *Attorney, Agent, or Firm* — Posz Law Group, PLC

(57) ABSTRACT

A yaw rate sensor has two sets of exciting electrodes, perturbative weights and two sets of detecting electrodes on a surface of a piezoelectric substrate. The exciting electrodes excite first surface acoustic waves transmitted through the surface of the substrate in a propagation direction. The weights are oscillated by the waves and excite a second surface acoustic wave, transmitted through the surface of the substrate in a detection direction orthogonal to the propagation direction, in response to a yaw applied to the weights. The detecting electrodes measure an intensity of the second surface acoustic wave to detect the yaw rate. The sets of exciting electrodes are symmetrically placed with respect to a driving axis extending straight along the propagation direction. The group of weights is symmetric with respect to the driving axis.

23 Claims, 15 Drawing Sheets

YAW RATE SENSOR USING SURFACE ACOUSTIC WAVE

CROSS-REFERENCE TO RELATED APPLICATION

This application is based upon and claims the benefit of priority of the prior Japanese Patent Application 2007-307749 filed on Nov. 28, 2007, so that the contents of which are incorporated herein by reference.

BACKGROUND OF THE INVENTION

1. Field of the Invention

The present invention relates generally to a yaw rate sensor mounted in a vehicle to detect a yaw rate applied to the sensor, and more particularly to the sensor which drives and oscillates perturbative weights with a surface acoustic wave and detects the yaw rate from acceleration of the weights caused in response to a yaw (i.e., an angular rotation) applied to the weights.

2. Description of Related Art

To detect a yaw rate or an angular rotation applied to a vehicle, a yaw rate sensor is mounted in the vehicle. Especially, a yaw rate sensor (i.e., an angular rate sensor or a gyro sensor) using a surface acoustic wave has been disclosed in each of Published Japanese Patent First Publication No. H08-334330 and U.S. Pat. No. 6,516,665. The principles in these sensors detecting yaw rates are the same. Each sensor is made of a piezoelectric device which has a driving electrode, detecting electrodes, reflectors, and a plurality of perturbative weights. These constitutional elements of the sensor are formed of metallic wires on a monolithic substrate.

FIG. 1 is a view showing a layout of a gyroscope disclosed in the Publication No. H08-334330. As shown in FIG. 1, a gyroscope 101 acting similar to a yaw rate sensor has a group of perturbative weights J1 formed in a square shape, a driving electrode J2 located to face the first side of the group of weights J1, a reflector J3 located to place the electrode J2 between the group of weights J1 and the reflector J3, and a reflector J4 located to face the second side of the group of weights J1 opposite to the first side. The weights J1, the electrodes J2 and the reflectors J3 and J4 are located on the surface of an acoustic wave substrate 111.

The weights J1 and the electrode J2 are placed between the reflectors J3 and J4, so that the electrode J2 and the reflectors J3 and J4 are aligned along the x-direction. The weights J1 are arranged in a checkerboard pattern. The electrode J2 is formed in a comb-like shape. More specifically, the electrode J2 has two first tooth portions, a first bus bar connected with ends of the first tooth portions, two second tooth portions, and a second bus bar connected with ends of the second tooth portions. Each of the tooth portions extends along the y-direction. The first tooth portions and the second tooth portions are alternately arranged at equal intervals along the x-direction. Therefore, the electrode J2 is not symmetrical with respect to any line extending in the x-direction. Each of the reflectors J3 and J4 is formed of a plurality of reflecting bars arranged in parallel to one another along the x-direction.

Therefore, the electrode J2 and the reflectors J3 and J4 aligned along the x-direction act as a first surface acoustic wave device. The weights J1 are located in the propagation path of a surface acoustic wave oscillated by the device, so that the weights J1 are oscillated with the wave.

Further, the gyroscope 101 has two detecting electrodes J5 and J6 located to face the respective other sides of the group of weights J1, and two reflectors J7 and J8 located to place the weights J1 and the electrodes J5 and J6 between the reflectors J7 and J8. The electrodes J5 and J6 and the reflectors J7 and J8 are located on the surface of the acoustic wave substrate 111. The electrodes J5 and J6 and the reflectors J7 and J8 are aligned along the y-direction and act as a second surface acoustic wave device. The weights J1 are located in the propagation path of a surface acoustic wave to be detected by the device.

Each of the electrodes J5 and J6 is formed in a comb-like shape. More specifically, the electrode J5 has two third tooth portions, a third bus bar connected with ends of the third tooth portions on the side nearer to the electrode J2, two fourth tooth portions, and a fourth bus bar connected with ends of the fourth tooth portions on the side nearer to the reflector J4. Each of the third and fourth tooth portions extends along the x-direction. Each of the third and fourth bus bars extends along the y-direction. The third tooth portions and the fourth tooth portions are alternately arranged at equal intervals along the y-direction such that one of the third tooth portions is placed closest to the weights J1. The electrode J6 has two fifth tooth portions, a fifth bus bar connected with ends of the fifth tooth portions on the side nearer to the reflector J4, two sixth tooth portions, and a sixth bus bar connected with ends of the sixth tooth portions on the side nearer to the electrode J2. Each of the fifth and sixth tooth portions extends along the x-direction. Each of the fifth and sixth bus bars extends along the y-direction. The fifth tooth portions and the sixth tooth portions are alternately arranged at equal intervals along the y-direction such that one of the fifth tooth portions is placed closest to the weights J1. Therefore, the electrodes J5 and J6 are not symmetrically placed with respect to any line extending in the x-direction.

Each of the reflectors J7 and J8 is formed of a plurality of reflecting bars arranged in parallel to one another along the y-direction.

The operation of this gyroscope 101 will be described with reference to FIG. 2. FIG. 2 is an enlarged view of the weights J1 (J11 to J15) driven and oscillated in response to a yaw applied to the gyroscope 101.

As shown in FIG. 2, when an alternating current is applied to the driving electrode J2 to drive and oscillate the electrode J2 with a signal set at a resonance frequency, the electrode J2 generates and excites a first surface acoustic wave transmitted in the x-direction on the surface of the substrate 111. The resonance frequency is dependent on the pitch of the electrode J2 and ranges from 10 to several hundreds MHz. The surface acoustic wave is repeatedly reflected by the reflectors J3 and J4 to be confined between the reflectors J3 and J4, so that the excitation efficiency of the surface acoustic wave is gradually heightened. Further, a standing wave having the resonance frequency is generated by the reflectors J3 and J4 in the propagation path between the electrode J2 and the reflector J4.

The pitch of the weights J1 along each of the x-direction and y-direction is set at the wavelength of the standing wave, and the weights J1 are placed at respective anti nodes of the standing wave at which the amplitude of the standing wave in the thickness direction orthogonal to the surface of the substrate is maximized. Therefore, each of the weights J1 (J11 to J15) is strongly oscillated in the z-direction at the amplitude maximized position. Because the standing wave has phases opposite to each other at two weights J1 adjacent to each other in a diagonal line, the weight J15 is oscillated in the direction opposite to that in the oscillation of the weights J11 to J14 surrounding the weight J15.

When a yaw about the x-direction is applied to the gyroscope 101, a Coriolis force acts on each of the weights J1. The Coriolis force is expressed by an acceleration Ay=2×Vz×Ωx by using a yaw rate Ωx of the yaw and an oscillation velocity Vz of the weights J1 oscillated in the z-direction. The Coriolis force is directed in the y-direction. Because each of the velocity Vz and the yaw rate Ωx is a vector quantity, the Coriolis force acting on the weight J15 is opposite to the Coriolis force acting on the weights J11 to J14.

The Coriolis force oscillates each of the weights J1 at the resonance frequency in the y-direction orthogonal to the oscillation direction of the standing wave, so that the weights J1 drives and excite a second surface acoustic wave transmitted in the y-direction. The weights J1 are arranged along the y-direction at the pitch equal to the wavelength of the second surface acoustic wave or a multiple of the wavelengths. Therefore, this surface acoustic wave is excited in the area of the detecting electrodes J5 and J6, and a second standing wave caused by the Coriolis force is excited between the reflectors J7 and J8. The strength of this standing wave is proportional to the Coriolis force.

Each of the detecting electrodes J5 and J6 measures the voltage or the quantity of electric charges induced by the standing wave. Because the phase of the surface acoustic wave transmitted to the electrode J5 is opposite to that transmitted to the electrode J6, the difference between the measured values of the electrodes J5 and J6 is calculated. Therefore, the gyroscope 101 can obtain the yaw rate.

However, the surface acoustic wave excited by the electrode J2 is necessarily scattered by each weight J1 toward the y-direction according to the principle and structure of this gyroscope. Therefore, these scattered waves are mixed with the surface acoustic wave caused by the Coriolis force. The intensity of the scattered waves is considerably larger than that of the surface acoustic wave caused by the Coriolis force. For example, the voltage obtained from the scattered waves is approximately $10^6$ times that of the second surface acoustic wave. Therefore, it is necessary to reduce the intensity of the scattered waves.

As a method for reducing the intensity of the scattered waves, two detecting electrodes are located on respective opposite sides of a group of perturbative weights to cancel out the scattered waves detected in the respective detecting electrodes. To cancel out the scattered waves, it is necessary that a first group of scattered waves detected in the electrode J5 has the same phase as that of a second group of scattered waves detected in the electrode J6. However, it is difficult to generate the groups of scattered waves having the same phase. Therefore, it is difficult to cancel out the scattered waves detected in the detecting electrodes.

SUMMARY OF THE INVENTION

An object of the present invention is to provide, with due consideration to the drawbacks of the conventional gyroscope, a yaw rate sensor which detects a yaw rate applied to the sensor with high precision while reducing scattered waves scattered from weights oscillated with a surface acoustic wave.

According to an aspect of this invention, the object is achieved by the provision of a yaw rate sensor comprising, a substrate, a group of exciting electrodes being disposed on a surface of the substrate to excite a first surface acoustic wave and to transmit the first surface acoustic wave through the surface of the substrate in a propagation direction, a group of perturbative weights being disposed on the surface of the substrate to be oscillated by the first surface acoustic wave in a thickness direction orthogonal to the propagation direction, to generate a second surface acoustic wave excited by a Coriolis force, which is induced in response to the oscillation of the group of perturbative weights and a yaw applied to the perturbative weights, and to transmit the second surface acoustic wave through the surface of the substrate in a detection direction orthogonal to both the propagation direction and the oscillation direction, and a detecting unit being disposed on the surface of the substrate to detect the yaw rate from the intensity of the second surface acoustic wave. The group of perturbative weights is symmetric with respect to a driving axis extending straight along the propagation direction, and the group of exciting electrodes is symmetric with respect to the driving axis.

With this structure of the sensor, when an alternating voltage is applied to the exciting electrodes, the exciting electrodes are oscillated to excite a first surface acoustic wave and to transmit the wave through the surface of the substrate in the propagation direction. Each perturbative weight is oscillated by the wave in the thickness direction. When a yaw or an angular rotation about the propagation direction is applied to the weights, the weights receive the Coriolis force to excite a second surface acoustic wave and to transmit the second surface acoustic wave through the surface of the substrate in the detection direction. The intensity of the second surface acoustic wave corresponds to the Coriolis force so as to indicate the yaw rate. The detecting unit measures the intensity of the second surface acoustic wave to detect the yaw rate.

Further, the first surface acoustic wave is scattered by each weight, and scattered waves are also transmitted in the detection direction. Because the group of exciting electrodes is symmetric with respect to the driving axis, symmetry of the scattered waves with respect to the driving axis is precisely obtained. That is, the phase of a first group of scattered waves transmitted toward one side of the driving axis becomes precisely the same as that of a second group of scattered waves transmitted toward the other side of the driving axis. Therefore, when the detecting unit measures a difference between the groups of scattered waves, the detecting unit receives no influence of the scattered waves on the detection of the yaw rate.

Accordingly, the adverse influence of the scattered waves can be reduced, so that the sensor can detect the yaw rate applied to the weights with high precision.

DETAILED DESCRIPTION OF THE PREFERRED EMBODIMENTS

Figure 1:
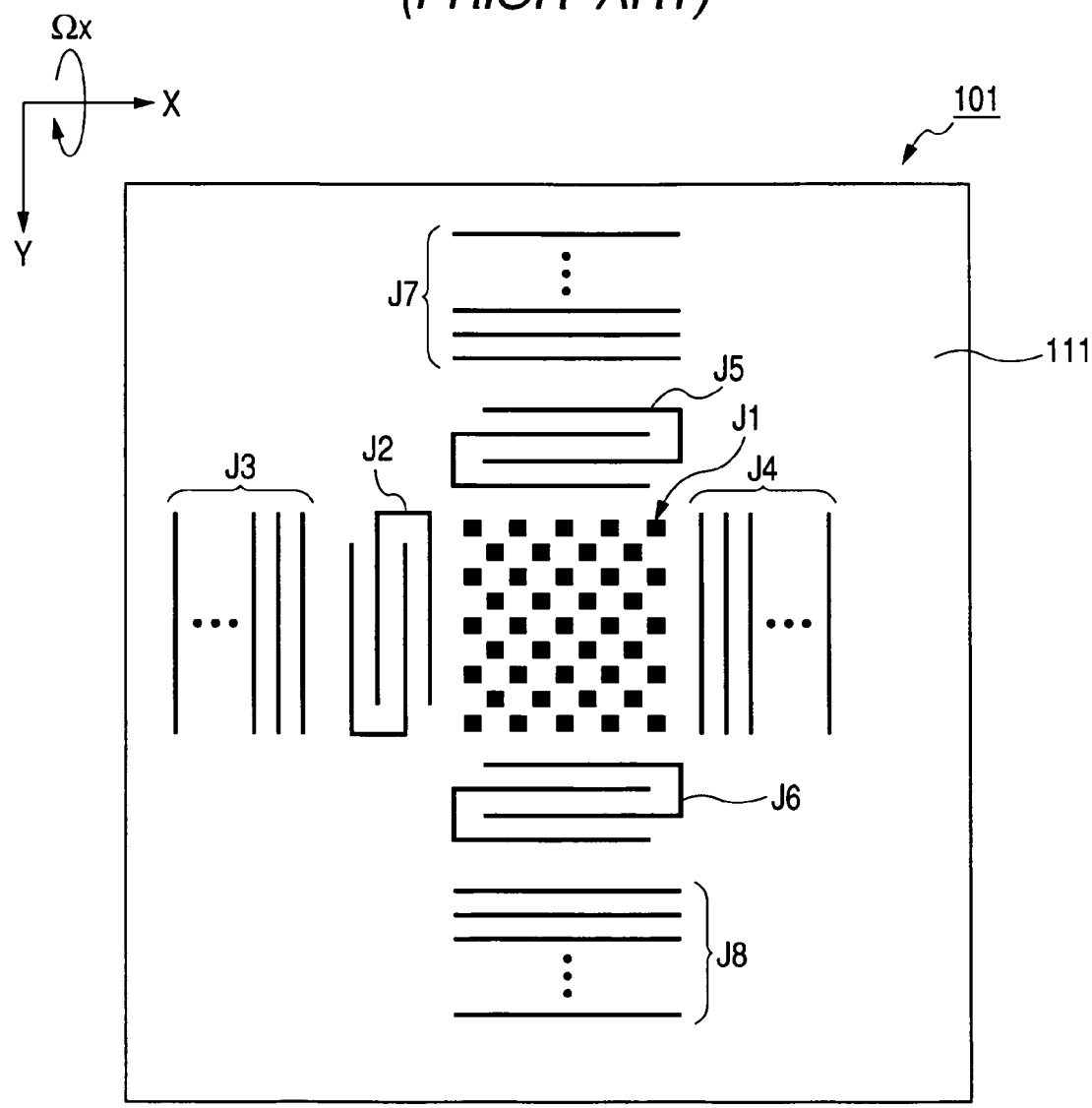
FIG. 1 is a view showing a layout of a gyroscope disclosed in Published Japanese Patent First Publication No. H08-334330.
Figure 2:
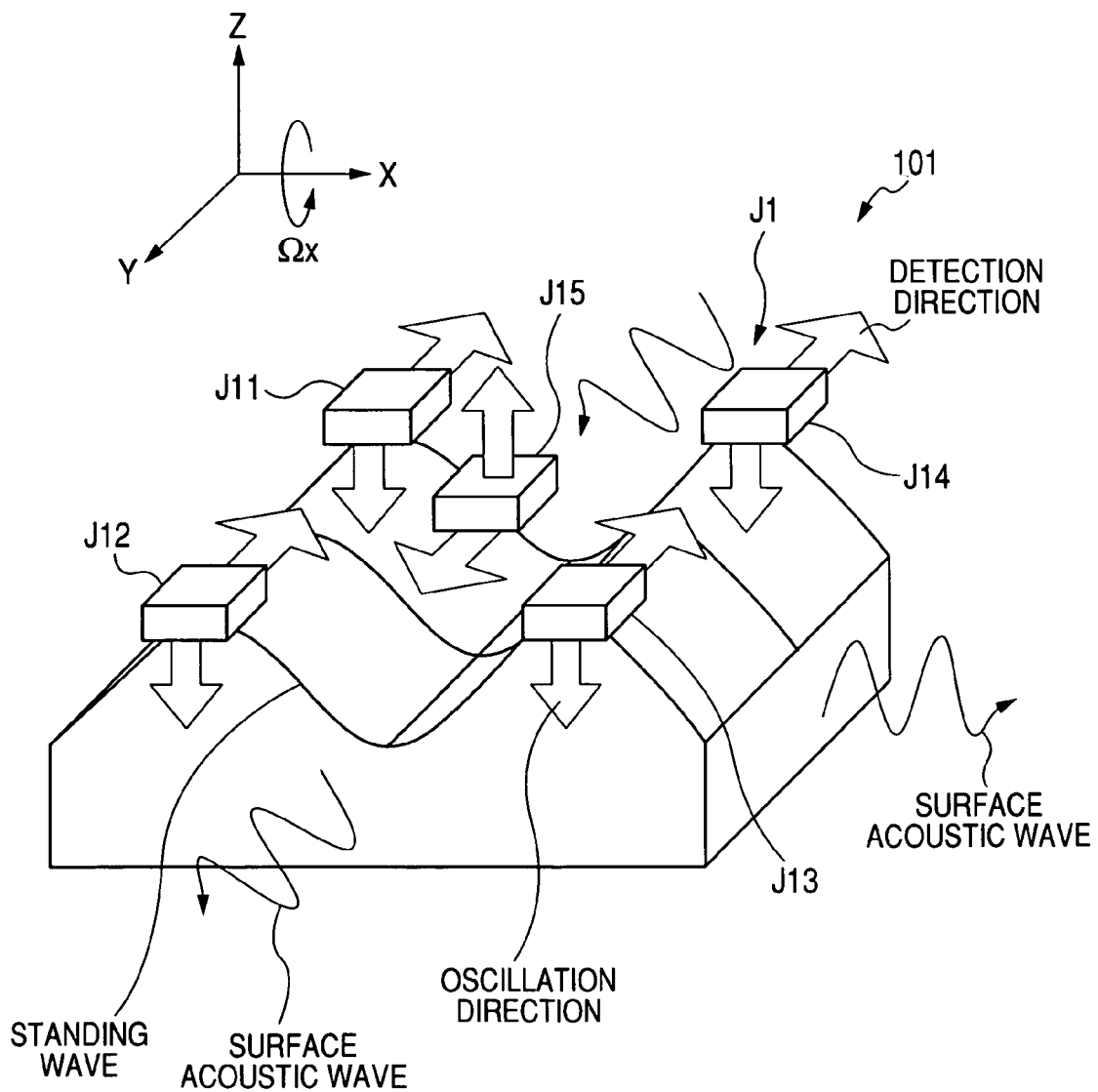
FIG. 2 is an enlarged view of weights driven and oscillated in response to a yaw applied to the gyroscope shown in FIG. 1.

Embodiments of the present invention will now be described with reference to the accompanying drawings, in which like reference numerals indicate like parts, members or elements throughout the specification unless otherwise indicated.

Embodiment 1

Figure 3:
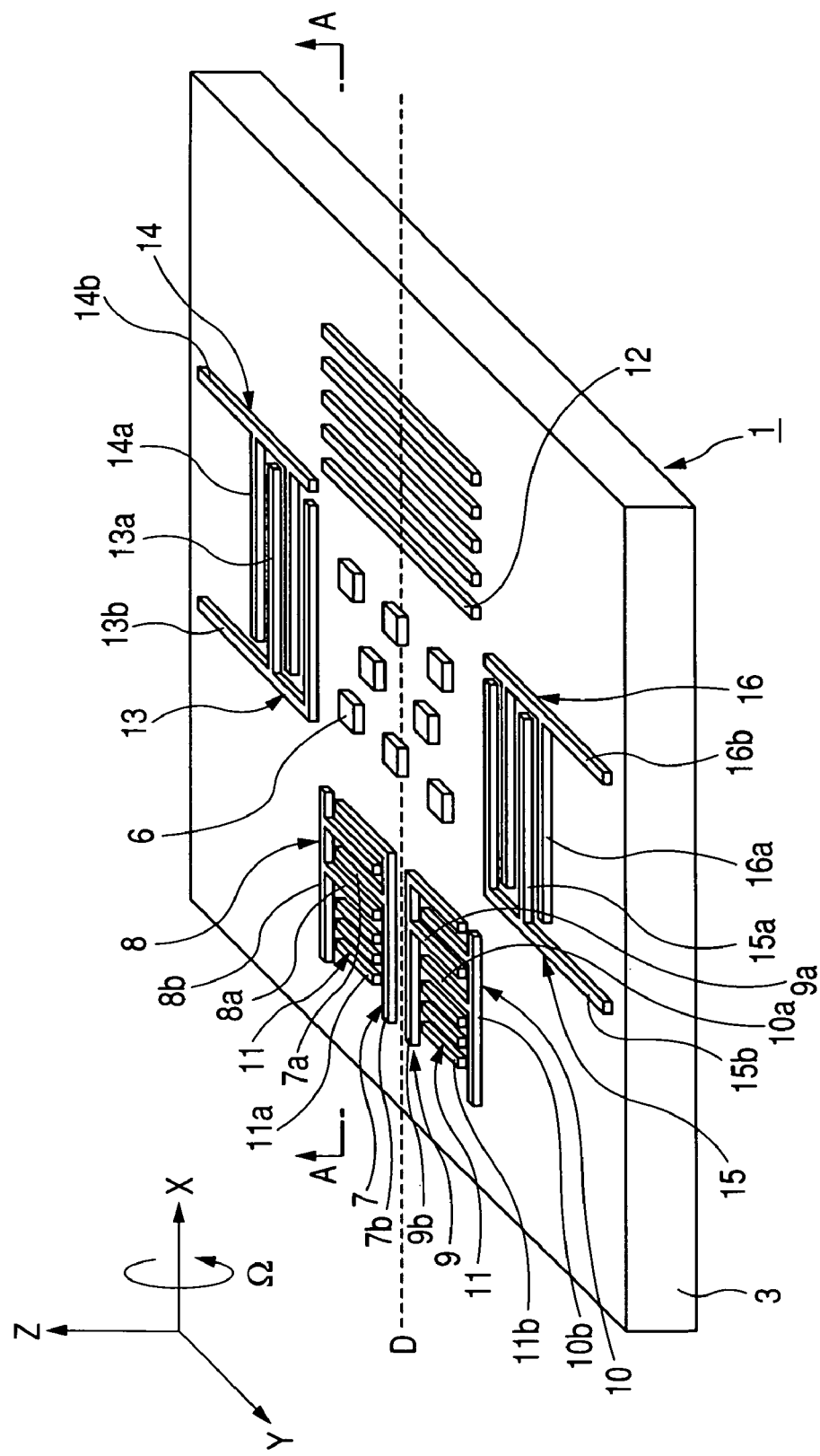
FIG. 3 is a perspective side view of a yaw rate sensor according to the first embodiment of the present invention.
Figure 4:
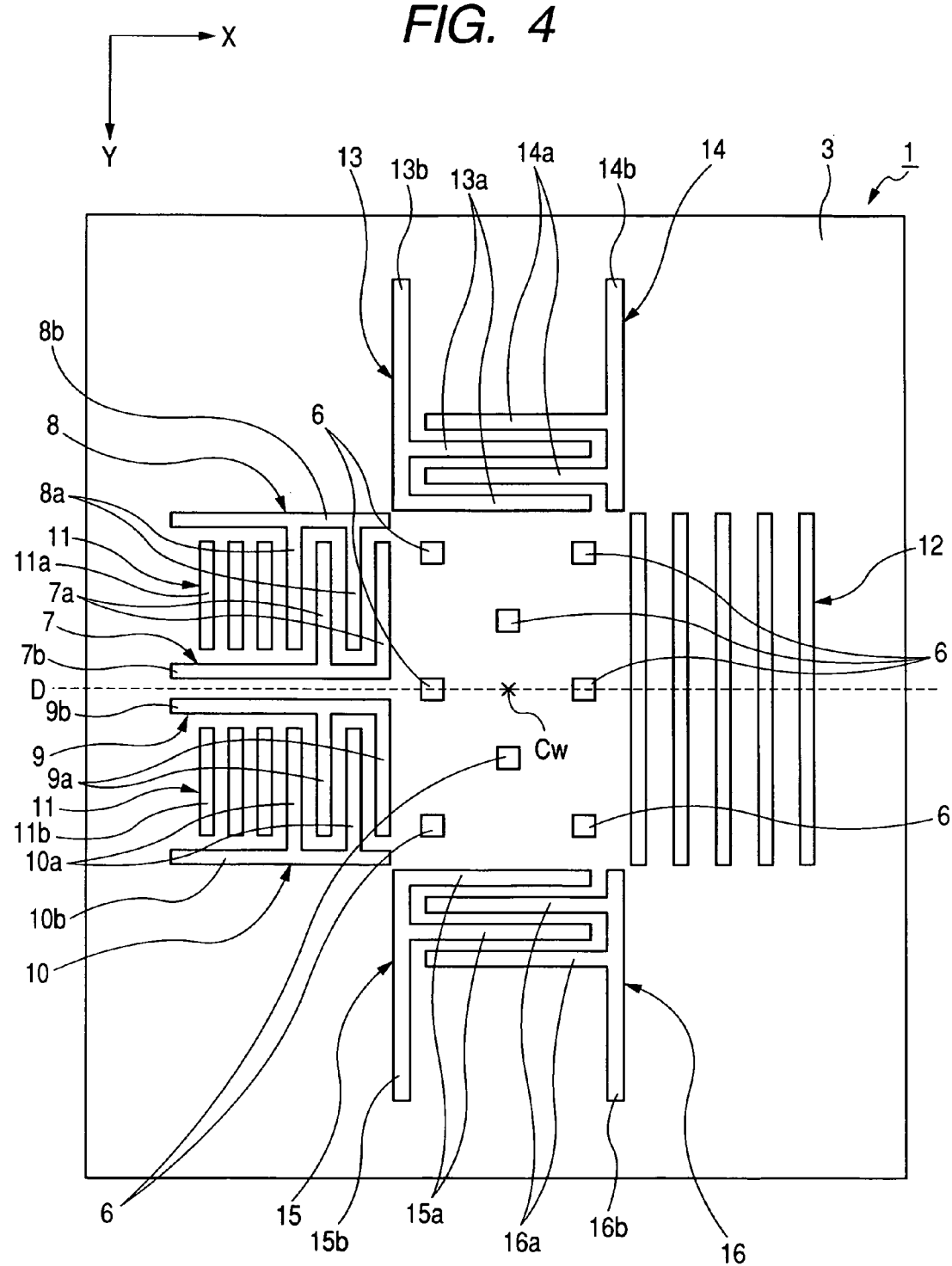
FIG. 4 is a plan view of the sensor shown in FIG. 3.
Figure 5:
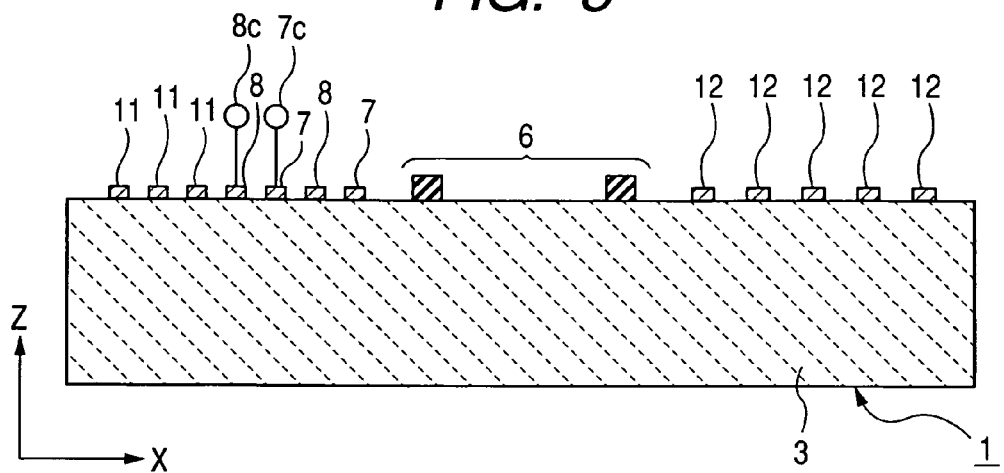
FIG. 5 is a sectional view taken substantially along line A-A of FIG. 3.

FIG. 3 is a perspective side view of a yaw rate sensor 1 according to the first embodiment of the present invention. FIG. 4 is a plan view of the sensor shown in FIG. 3. FIG. 5 is a sectional view taken substantially along line A-A of FIG. 3.

As shown in FIG. 3, FIG. 4 and FIG. 5, a yaw rate sensor 1 has a piezoelectric substrate 3 and a sensing section disposed on the upper surface of the substrate 3. The thickness of the substrate 3 is 400 µm or more. The substrate 3 is made of a piezoelectric material such as lithium niobate, lithium tantalate or the like. The sensing section has a pair of first and second exciting electrodes 7 and 8 which excites a first surface acoustic wave propagated along an x-direction (i.e., propagation direction) as a surface acoustic wave exciting unit, another pair of third and fourth exciting electrodes 9 and 10 which excites another first surface acoustic wave propagated along the x-direction as another surface acoustic wave exciting unit, a plurality of perturbative weights 6 which are oscillated in a z-direction in response to the first surface acoustic waves and are oscillated in a y-direction (i.e., detection direction) in response to a yaw applied to the weights 6 at a yaw rate to generate a second surface acoustic wave propagated along the y-direction, and a pair of detecting electrodes (i.e., a detecting unit) 13 and 14 which measures the intensity of the second surface acoustic wave to detect a yaw rate of the yaw. The z-direction accords with the thickness direction of the substrate 3.

The sensor 1 may further have another pair of detecting electrodes (i.e., another detecting unit) 15 and 16 which measures the intensity of the second surface acoustic wave to detect the yaw rate. The sensor 1 may further have two reflectors 11 and 12 for reflecting the first surface acoustic waves excited by the electrodes 7 to 10 between the reflectors 11 and 12 to change each first surface acoustic wave from a traveling wave to a standing wave.

The group of weights 6 is formed in a square shape and is symmetric with respect to a driving axis D extending straight along the x-direction. That is, the driving axis D substantially passes through the center Cw of the group of weights 6. In this specification, symmetry of a constitutional element or constitutional elements with respect to an axis denotes symmetry of an image of the element or elements projected onto the plane including the upper surface of the substrate 3. Therefore, the driving axis D is placed on the upper surface of the substrate 3. The driving axis D partitions the upper surface of the substrate 3 into a first area and a second area. Each of first and second sides of the square formed by the weights 6 extends across the driving axis D.

Each of the electrodes 7 to 10 is formed in a comb-like shape. The pair of electrodes 7 and 8 is disposed on the first area of the substrate 3 to face the first side of the weights 6. The pair of electrodes 9 and 10 is disposed on the second area of the substrate 3 to face the first side of the weights 6. The electrodes 7 and 9 are located adjacent to each other to be symmetric with each other with respect to the driving axis D. The electrodes 8 and 10 face each other through the electrodes 7 and 9 to be symmetric with each other with respect to the driving axis D. Therefore, the pair of electrodes 7 and 8 is symmetric with the pair of electrodes 9 and 10 with respect to the driving axis D.

The reflector 11 is located so as to place the exciting electrodes 7 to 10 between the reflector 11 and the group of weights 6. The reflector 12 faces the second side of the weights 6 opposite to the first side to be symmetric with respect to the driving axis D, so that the weights 6 and the exciting electrodes 7 to 10 are placed between the reflectors 11 and 12. Therefore, the perturbative weights 6, the exciting electrodes 7, 8, 9 and 10 and the reflectors 11 and 12 are located along the x-direction.

Each of the electrodes 13 to 16 is formed in a comb-like shape. The electrodes 13 and 14 are disposed on the first area of the substrate 3 to face the third side of the weights 6. The electrodes 15 and 16 are disposed on the second area of the substrate 3 to face the fourth side of the weights 6 opposite to the third side. The electrodes 13 and 15 are symmetric with each other with respect to the driving axis D, and the electrodes 14 and 16 are symmetric with each other with respect to the driving axis D. Therefore, the group of electrodes 13 and 14 is symmetric with the group of electrodes 15 and 16 with respect to the driving axis D. The perturbative weights 6 and the detecting electrodes 13 to 16 are located along the y-direction to form a second surface acoustic device.

The perturbative weights 6 are made of an electrically insulating material such as silicon oxide ($SiO_2$) or silicon nitride ($Si_3N_4$). The weights 6 are formed by depositing a film of the insulating material and patterning the film according to a semiconductor processing method normally used. The thickness of the weight 6 is set in a range from 1 to 5 µm.

Each of the exciting electrodes 7 to 10, the reflectors 11 and 12 and the detecting electrodes 13 to 16 is made of a metallic material such as polycrystalline silicon (poly-silicon) doped with impurities, aluminum (Al), titanium (Ti), gold (Au), platinum (Pt), tungsten (W), ruthenium (Ru) or the like or an alloy containing the metallic material such as Al—Si—Cu, TiW or the like. When the electrodes and reflectors are formed of poly-silicon doped with impurities, Al, Ti, Al—Si—Cu or the like according to the semiconductor processing method, metal contamination in the formation of the electrodes and reflectors can be prevented. Each of the exciting electrodes 7 to 10, the reflectors 11 and 12 and the detecting electrodes 13 to 16 has a thickness set at 1 µm or less.

Each perturbative weight 6 is formed in a rectangular parallelepiped having a square-shaped upper surface. The weights 6 are arranged in a checkerboard pattern. An outline of the weights 6 is formed in a square shape. More specifically, the weights 6 are arranged in a plurality of rows aligned in the x-direction at equal intervals. A weight distance between each pair of adjacent rows in the x-direction is equal to the wavelength λ of the standing wave or a half of the wavelength λ. Therefore, the weights 6 are placed at antinodes of the standing wave at which the amplitude of the standing wave is maximized. The weights 6 in any row are shifted by the weight distance in the y-direction as compared with the weights 6 in the adjacent row.

The exciting electrode 7 has a plurality of tooth portions 7a (in this embodiment, two tooth portions) and a bus bar 7b connected with ends of the tooth portions 7a on the first side of the y-direction nearer to the driving axis D. The exciting electrode 8 has a plurality of tooth portions 8a (in this embodiment, two tooth portions) and a bus bar 8b connected with ends of the tooth portions 8a on the second side of the y-direction opposite to the first side. Each of the tooth portions 7a and 8a extends in the y-direction. Each of the bars 7b and 8b extends in the x-direction. The tooth portions 7a and 8a are alternately located at equal intervals along the x-direction between the bars 7b and 8b so as to face one another in the x-direction.

The exciting electrode 9 has a plurality of tooth portions 9a (in this embodiment, two tooth portions) and a bus bar 9b connected with ends of the tooth portions 9a on the second side of the y-direction nearer to the driving axis D. The exciting electrode 10 has a plurality of tooth portions 10a (in this embodiment, two tooth portions) and a bus bar 10b connected with ends of the tooth portions 10a on the first side of they-direction. Each of the tooth portions 9a and 10a extends in the y-direction. Each of the bars 9b and 10b extends in the x-direction. The tooth portions 9a and the tooth portions 10a are alternately located at equal intervals along the x-direction between the bars 9b and 10b so as to face one another in the x-direction.

Each of the exciting electrodes 7 to 10 receives a driving voltage at a terminal 7c or 8c from a driving power source (not shown) through a driving voltage applying line (not shown) such as a bonding wire. In response to the driving voltage, the exciting electrodes 7 and 8 are oscillated in the z-direction to excite a first surface acoustic wave on the upper surface of the substrate 3, and the exciting electrodes 9 and 10 are oscillated in the z-direction to excite another first surface acoustic wave on the upper surface of the substrate 3.

The reflector 11 has a plurality of first reflecting bars 11a arranged in parallel to one another along the x-direction and a plurality of second reflecting bars 11b arranged in parallel to one another along the x-direction. Each of the bars 11a and 11b extends straight in the y-direction. The first reflecting bars 11a and the tooth portions 7a and 8a of the exciting electrodes 7 and 8 are located at equal intervals along the x-direction between the bus bars 7b and 8b of the electrodes 7 and 8, and the tooth portions 7a and 8a are placed between the group of bars 11a and the group of weights 6. The second reflecting bars 11b and the tooth portions 9a and 10a of the exciting electrodes 9 and 10 are located at equal intervals along the x-direction between the bus bars 9b and 10b of the electrodes 9 and 10, and the tooth portions 9a and 10a are placed between the group of bars 1ib and the group of weights 6. Therefore, the group of bars 11a and the group of bars 11b are symmetrically placed with respect to the driving axis D.

The reflector 12 has a plurality of reflecting bars arranged at equal intervals along the x-direction. Each bar extends straight in the y-direction so as to cross the driving axis D. The length of each bar in the y-direction is equal to or larger than the width of the weights 6 so as to cover the weights 6 along the y-direction.

The detecting electrode 13 has a plurality of tooth portions 13a (in this embodiment, two tooth portions) and a bus bar 13b connected with ends of the tooth portions 13a on the first side of the x-direction. The detecting electrode 14 has a plurality of tooth portions 14a (in this embodiment, two tooth portions) and a bus bar 14b connected with ends of the tooth portions 14a on the second side of the x-direction opposite to the first side. Each of the tooth portions 13a and 14a extends in the x-direction. Each of the bars 13b and 14b extends in the y-direction. The tooth portions 13a and 14a are alternately located at equal intervals along the y-direction between the bars 13b and 14b so as to face one another in they-direction. Therefore, the exciting electrodes 13 and 14 act as a detecting unit.

The detecting electrode 15 has a plurality of tooth portions 15a (in this embodiment, two tooth portions) and a bus bar 15b connected with ends of the tooth portions 15a on the first side of the x-direction. The detecting electrode 16 has a plurality of tooth portions 16a (in this embodiment, two tooth portions) and a bus bar 16b connected with ends of the tooth portions 16a on the second side of the x-direction opposite to the first side. Each of the tooth portions 15a and 16a extends in the x-direction. Each of the bars 15b and 16b extends in the y-direction. The tooth portions 15a and 16a are alternately located at equal intervals along the y-direction between the bars 15b and 16b so as to face one another in they-direction. Therefore, the exciting electrodes 15 and 16 act as another detecting unit.

Figure 6:
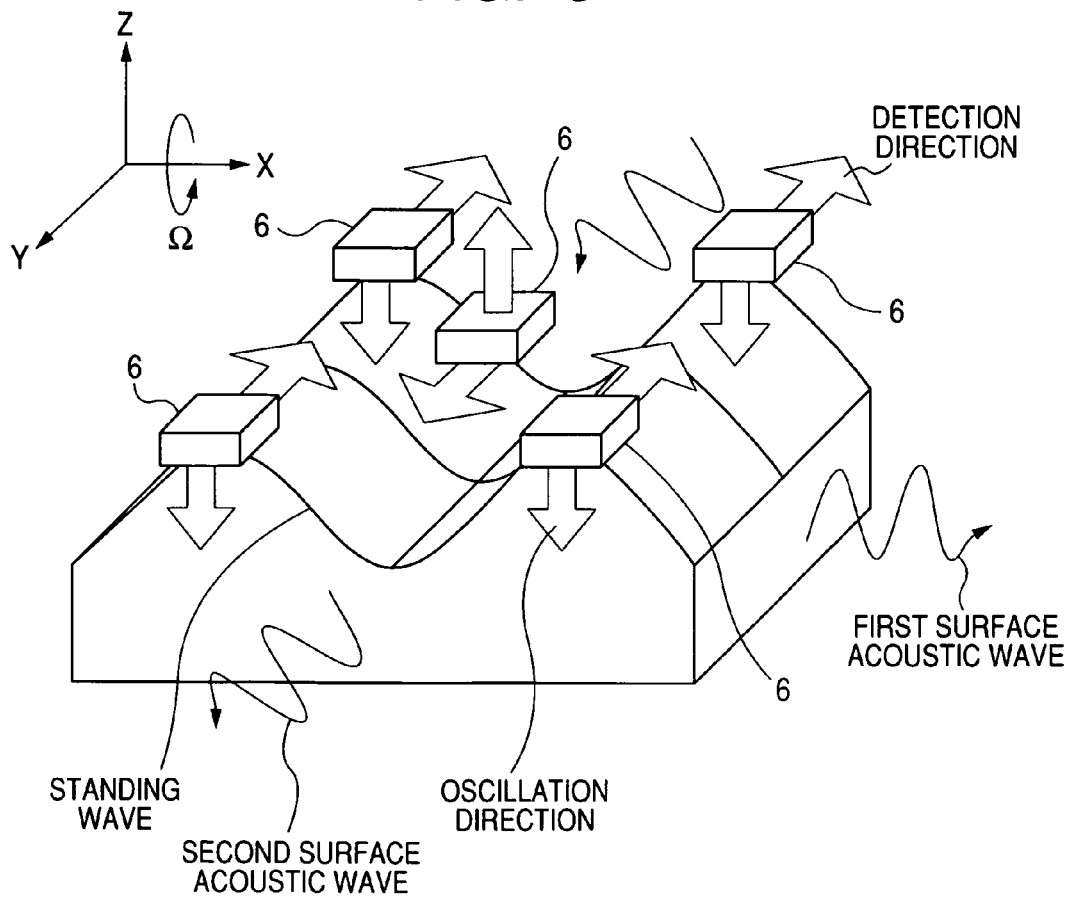
FIG. 6 is an enlarged view of weights driven and oscillated in the sensor in response to a yaw applied to the sensor.

Next, an operation of the yaw rate sensor 1 is now described below. FIG. 6 is an enlarged view of the weights 6 driven and oscillated in response to a yaw applied to the weights 6.

When an alternating voltage is applied to each of the exciting electrodes 7 to 10 as a driving voltage, the sensor 1 is driven. For example, a first alternating voltage V1 (V1=B×cos ωt) is applied to each of the exciting electrodes 7 and 9 symmetrically placed with respect to the axis D, and a second alternating voltage V2 (V2=B×cos (ωt−π)) is applied to each of the exciting electrodes 8 and 10 symmetrically placed with respect to the axis D. The first and second alternating voltages have the same amplitude (V2=−V1) and the same angular frequency ω, but the phases of the first and second alternating voltages are shifted from each other by π (i.e., a half of one cycle 2π/ω). Therefore, the exciting electrodes 7 to 10 are driven and oscillated in the z-direction in response to the first and second alternating voltages, the exciting electrodes 7 and 8 generate a first surface acoustic wave, and the exciting electrodes 9 and 10 generate another first surface acoustic wave. These waves are propagated in the x-direction through the upper surface of the substrate 3.

The surface acoustic waves can be generated at a maximum efficiency when the frequency ω/2π of the alternating voltage is set at a resonance frequency fr. This resonance frequency depends on the intervals among the tooth portions 7a and 8a (or among the tooth portions 9a and 10a) and physical properties of the substrate 3. In this embodiment, the frequency of the alternating voltage is adjusted in a range from 5 MHz to 500 MHz, and the first surface acoustic waves are efficiently generated.

When the oscillations of the electrodes 7 to 10 are started, first surface acoustic waves are normally excited in the propagation path as traveling waves. Then, the reflectors 11 and 12 reflect the surface acoustic waves to confine the waves in the propagation path between the reflectors 11 and 12. Therefore, the surface acoustic waves are changed from the traveling waves to a standing wave excited between the reflectors 11 and 12.

As shown in FIG. 6, because the weights 6 in each row are placed at one antinode of the standing wave, the weights 6 are oscillated along the z-direction at the same amplitude. One row of weights 6 in each pair of adjacent rows is moved at an oscillation velocity toward the front side of the sensor 1, and the other row of weights 6 is moved at another oscillation velocity toward the rear side of the sensor 1. The absolute values of the oscillation velocities are the same. Because the weights 6 are oscillated with the standing wave at the antinodes of the standing wave, the maximum amplitude of the standing wave can be maintained at a high level.

Thereafter, when a yaw (or an angular rotation) about the x-direction is applied to the weights 6 at a yaw rate (or an angular velocity) $\Omega$, a Coriolis force F(t) acts on each of the weights 6 in the y-direction orthogonal to both the thickness direction (i.e., z-direction) and the direction (i.e., x-direction) of the yaw. The Coriolis force acting on each weight 6 depends on the mass m of the weight 6, the oscillation velocity v(t) of the weight 6, and the yaw rate $\Omega$. The relation F(t)=2 mv(t)$\Omega$ is satisfied. Here, the oscillation velocity v(t) depends on the amplitude r(t) of the weight 6 and the angular frequency $\omega$, and the relation v(t)=r(t)$\omega$ is satisfied. The angular frequency $\omega$ is expressed by using the resonance frequency fr. The relation $\omega=2\pi$fr is satisfied.

Further, the frequency of the standing wave is the same as the frequency of the driving voltage, and the frequency of the oscillating motion of the weight 6 accords with the frequency of the standing wave. The Coriolis force is oscillated with the oscillating motion of the weight 6. That is, the Coriolis force is changed at the frequency fr so as to be periodically directed toward both sides of the y-direction. Therefore, a second surface acoustic wave is excited by the Coriolis force so as to propagate in the y-direction.

The detecting electrodes 13 to 16 are disposed on both sides of the weights 6 in the y-direction, and the tooth portions 13a to 16a of the detecting electrodes 13 to 16 are placed at antinodes of the second surface acoustic wave. Therefore, the detecting electrodes 13 to 16 are oscillated in the z-direction with the second surface acoustic wave. The oscillation amplitude of the second surface acoustic wave depends on the strength of the Coriolis force, and the amplitude in the oscillation motion of the detecting electrodes 13 to 16 depends on the oscillation amplitude of the second surface acoustic wave. Further, the phase of the surface acoustic wave transmitted to the detecting electrodes 13 and 14 is opposite to the phase of the surface acoustic wave transmitted to the detecting electrodes 15 and 16.

A control unit (not shown) measures the difference between the amplitude in the oscillation motion of the pair of detecting electrodes 13 and 14 and the amplitude in the oscillation motion of the pair of detecting electrodes 15 and 16 and produces an electric signal such as a voltage signal or a current signal from the difference. The sensor 1 detects the yaw rate $\Omega$ of the yaw applied to the weights 6 from the level of the signal.

As described above, the driving axis D extending straight along the x-direction is defined on the upper surface of the substrate 3 such that the group of perturbative weights 6 is symmetric with respect to the driving axis D, and the pair of the exciting electrodes 7 and 8 is placed in line-symmetric with the pair of the exciting electrodes 9 and 10 with respect to the driving axis D. Therefore, the phase of the surface acoustic wave transmitted to the detecting electrodes 13 and 14 can be precisely set to be opposite to the phase of the surface acoustic wave transmitted to the detecting electrodes 15 and 16. Accordingly, the sensor 1 can precisely detect the yaw rate $\Omega$ of the yaw applied to the weights 6.

The reason that the phase of the surface acoustic wave transmitted to the detecting electrodes 13 and 14 is precisely set to be opposite to the phase of the surface acoustic wave transmitted to the detecting electrodes 15 and 16 will be described. The acoustic velocity of a surface acoustic wave passing under an electrode differs from that passing the surface of the substrate 3 on which no electrode is disposed. Therefore, assuming that a first exciting electrode and a second exciting electrode are not symmetrically placed with respect to the driving axis D, the phase of a surface acoustic wave excited by the first exciting electrode is differentiated from that excited by the second exciting electrode. In this case, the oscillations of weights oscillated by the surface acoustic waves having the different phases have a phase difference. Therefore, the phase of a surface acoustic wave transmitted toward one side of the driving axis D in response to the oscillations of the weights is not opposite to the phase of a surface acoustic wave transmitted toward the other side of the driving axis D in response to the oscillations of the weights. However, in this embodiment, because of the symmetry of the electrodes 7 to 10 with respect to the driving axis D, the phase of a surface acoustic wave excited by the pair of exciting electrodes 7 and 8 becomes precisely the same as that excited by the pair of exciting electrodes 9 and 10. Therefore, the phase of the surface acoustic wave transmitted to the detecting electrodes 13 and 14 can be precisely set to be opposite to the phase of the surface acoustic wave transmitted to the detecting electrodes 15 and 16.

Further, the weights 6 scatter the first surface acoustic waves excited by the exciting electrodes 7 to 10 so as to generate scattered waves transmitted in the y-direction. Because of the symmetry of the group of perturbative weights 6 with respect to the driving axis D and the symmetry of the electrodes 7 to 10 with respect to the driving axis D, phases of the first surface acoustic waves are symmetric with respect to the driving axis D. Therefore, the symmetry of the scattered waves with respect to the driving axis D can be precisely obtained. That is, the phase of a first group of scattered waves transmitted toward the pair of electrodes 13 and 14 becomes precisely the same as that of a second group of scattered waves transmitted toward the pair of electrodes 15 and 16. Therefore, the groups of scattered waves detected in the sensor 1 are cancelled out.

Accordingly, the adverse influence of the scattered waves on the detection of the yaw rate can be reduced, and the yaw rate sensor 1 can detect the yaw rate $\Omega$ of the yaw applied to the weights 6 with high precision.

In addition to the symmetry of the electrodes 7 to 10 with respect to the driving axis D, the pair of the detecting electrodes 13 and 14 is located in line-symmetric with the pair of the detecting electrodes 15 and 16 with respect to the driving axis D. Therefore, the adverse influence of the scattered waves on the detection of the yaw rate in the detecting electrodes 13 to 16 can be further reduced. Accordingly, as compared with a sensor having one pair of the detecting electrodes only on one side of the axis D, the yaw rate sensor 1 can detect the yaw rate $\Omega$ with higher precision.

In the prior art such as a gyroscope disclosed in Published Japanese Patent First Publication No. H08-334330 or U.S. Pat. No. 6,516,665, perturbative electrodes or structures corresponding to the perturbative weights 6 are made of a metallic material to simplify the manufacturing process of the gyroscope. However, the weights 6 may be made of a nonmetallic material when the nonmetallic material has a large density sufficient as a weight. In this embodiment, the weights 6 are made of a nonmetallic material such as silicon oxide or silicon nitride. The density of silicon oxide is 2200 kg/m$^3$, and the density of silicon nitride is 3100 kg/m$^3$. Because these densities are substantially the same as the density (2700 kg/m$^3$) of aluminum generally used for weights, when each weight 6 is formed substantially at the same thickness as that in the prior art, the weights 6 can be oscillated with the first surface acoustic waves substantially at the same sensitivity as that in the prior art.

Figure 7A:
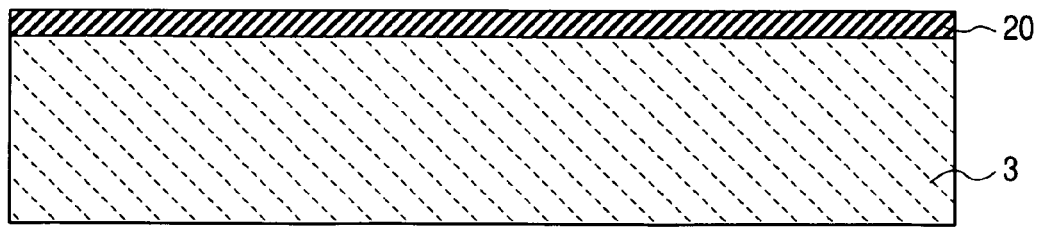
FIG. 7A is a sectional view of an insulating film formed on a substrate of the sensor in the first process of the manufacturing method.
Figure 7B:
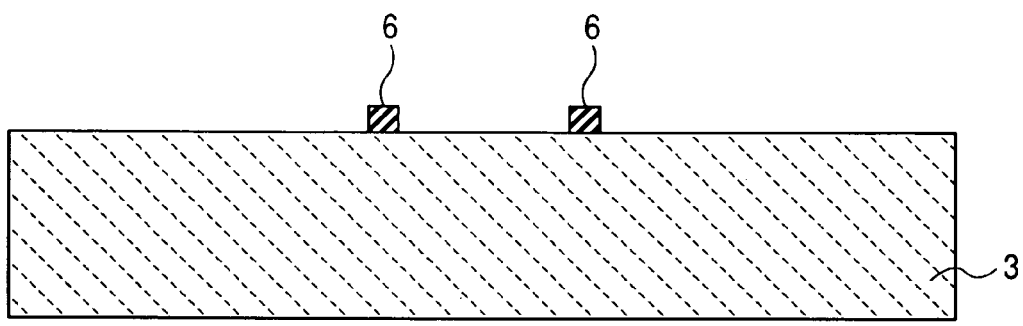
FIG. 7B is a sectional view of the insulating film patterned in the second process of the manufacturing method.
Figure 7C:
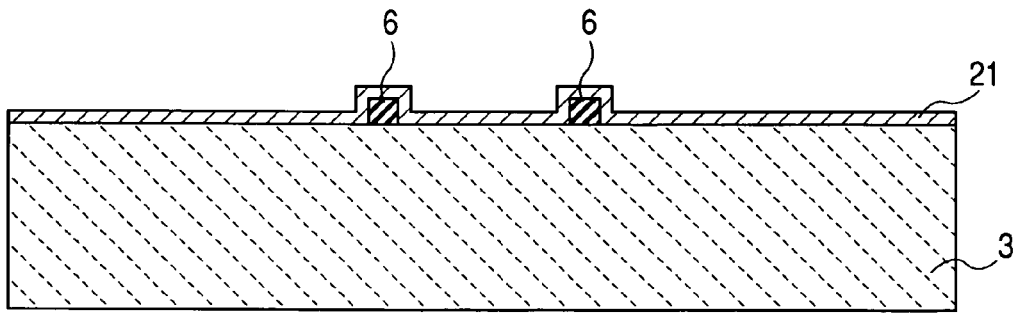
FIG. 7C is a sectional view of a conductive film formed on the substrate in the third process of the manufacturing method.
Figure 7D:
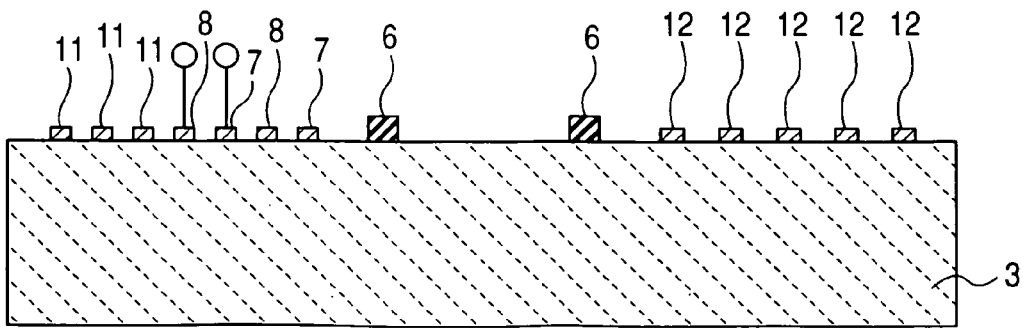
FIG. 7D is a sectional view of weights, exciting electrodes, reflectors and detecting electrodes formed on the substrate in the fourth process of the manufacturing method.

Next, a manufacturing method of the sensor 1 according to this embodiment will be described with reference to FIG. 7A to FIG. 7D. FIG. 7A is a sectional view of an insulating film formed on the substrate 3 in the first process of the manufacturing method. FIG. 7B is a sectional view of the insulating film patterned in the second process of the manufacturing method. FIG. 7C is a sectional view of a conductive film formed on the substrate 3 in the third process of the manufacturing method. FIG. 7D is a sectional view of the weights 6, the exciting electrodes 7 to 10, the reflectors 11 and 12 and the detecting electrodes 13 to 16 formed on the substrate 3 in the fourth process of the manufacturing method.

In the first process shown in FIG. 7A, a piezoelectric substrate having a thickness of 400 µm or more is prepared as the substrate 3. Then, an insulating film 20 having a thickness ranging from 1 to 5 µm is formed or deposited on the upper surface of the substrate 3. The film 20 is made of silicon oxide, silicon nitride or the like.

Thereafter, in the second process shown in FIG. 7B, regions of the weights 6 planned to be formed are covered with masks (not shown), and the insulating film 20 is patterned by wet etching or dry etching to form the weights 6 on the upper surface of the substrate 3. When the film 20 is made of silicon oxide, the film 20 is, for example, wet-etched with hydrofluoric acid. When the film 20 is made of silicon nitride, the film 20 is, for example, wet-etched with phosphoric acid.

Thereafter, in the third process shown in FIG. 7C, a conduct film 21 is formed or deposited at the thickness of 1 µm or less on the surfaces of the substrate 3 and the weights 6. The film 21 is made of a metallic material such as poly-silicon doped with impurities, Al, Ti, Au, Pt, W, Ru or the like or an alloy containing the metallic material such as Al—Si—Cu, Al—Cu, TiW or the like. Preferably, the exciting electrodes 7 to 10 and the detecting electrodes 13 to 16 should be made of a light-weighted material such as Al, Ti or the like. Especially, when the electrodes are made of Al, the light-weighted material can be deposited and/or etched to form the electrodes and another constitutional element in a normal semiconductor process.

Thereafter, in the fourth process shown in FIG. 7D, regions of the exciting electrodes 7 to 10, the reflectors 11 and 12 and the detecting electrodes 13 to 16 planned to be formed are covered with masks (not shown), and the conduct film 21 is patterned by wet etching or dry etching to form the exciting electrodes 7 to 10, the reflectors 11 and 12 and the detecting electrodes 13 to 16. When the conduct film 21 is, for example, made of Al, the conduct film 21 is wet-etched with phosphoric acid.

Thereafter, driving voltage applying lines are connected to the exciting electrodes 7 to 10 by wire bonding, and ground lines are connected to the detecting electrodes 13 to 16 by wire bonding. Accordingly, the sensor 1 can be manufactured.

Embodiment 2

Figure 8:
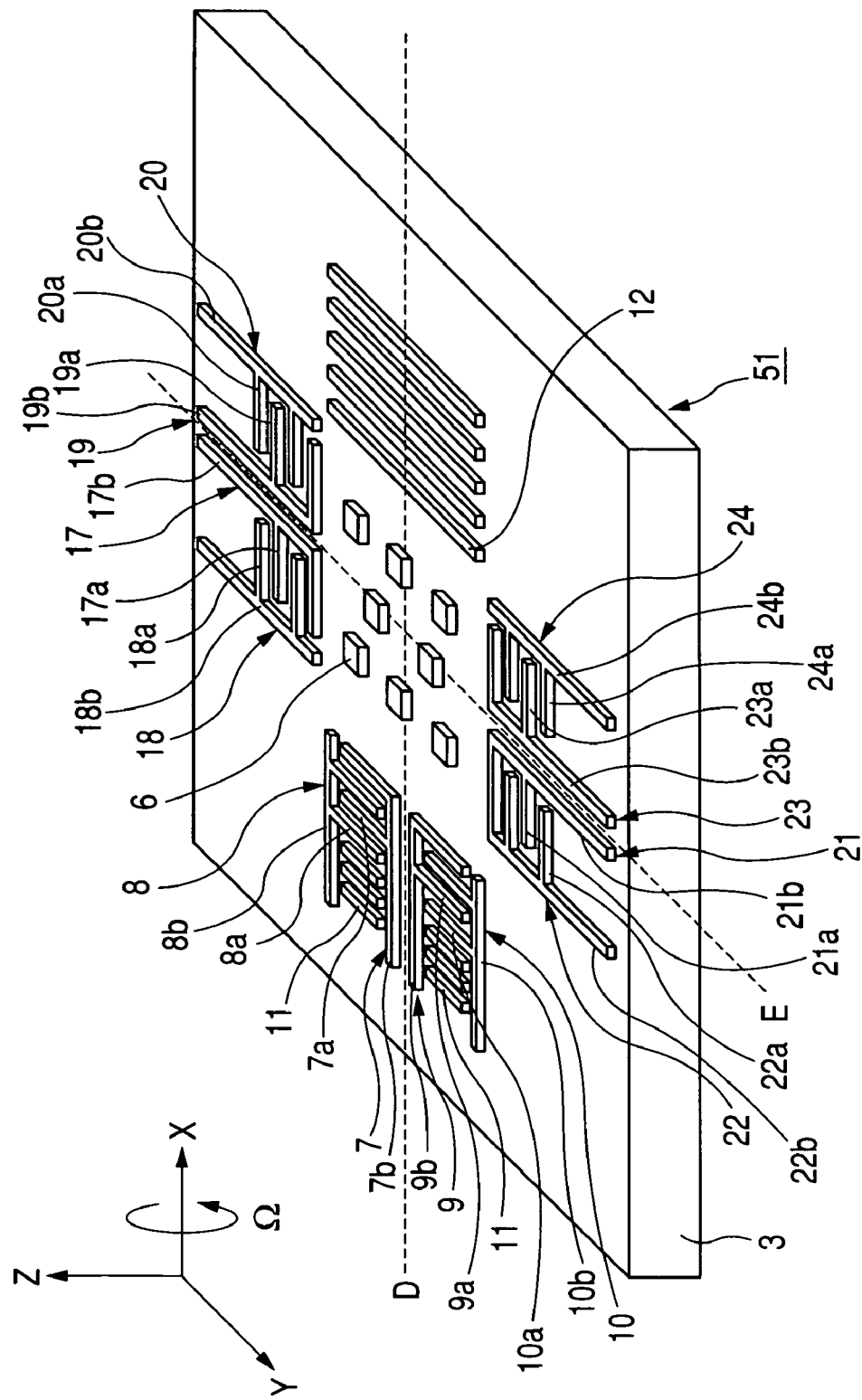
FIG. 8 is a perspective side view of a yaw rate sensor according to the second embodiment of the present invention.
Figure 9:
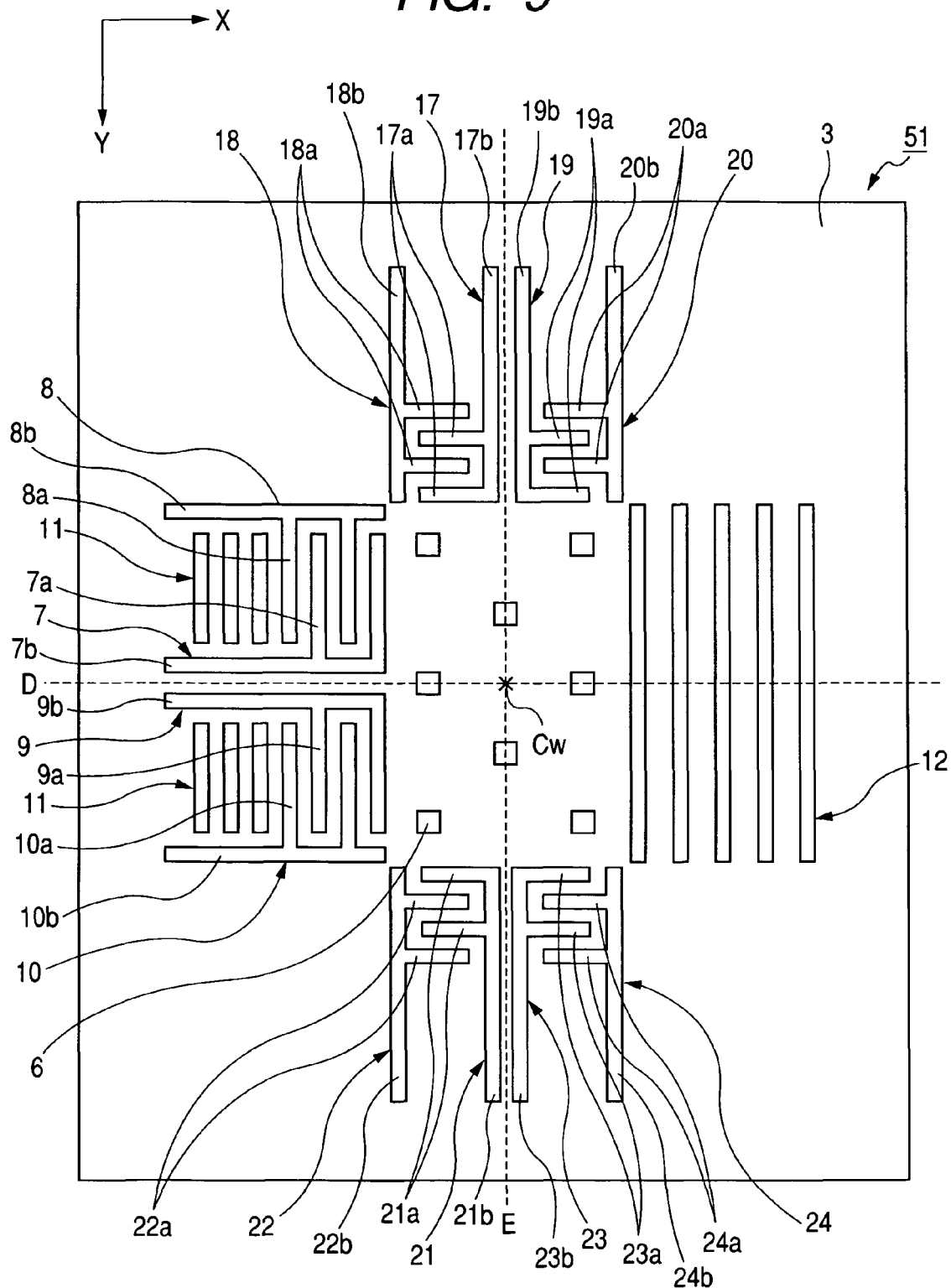
FIG. 9 is a plan view of the sensor shown in FIG. 8.

FIG. 8 is a perspective side view of a yaw rate sensor 51 according to the second embodiment, while FIG. 9 is a plan view of the sensor shown in FIG. 8.

As shown in FIG. 8 and FIG. 9, the yaw rate sensor 51 according to the second embodiment differs from the sensor 1 shown in FIG. 3 in that the sensor 51 has a pair of detecting electrodes 17 and 18, a pair of detecting electrodes 19 and 20, a pair of detecting electrodes 21 and 22, and a pair of detecting electrodes 23 and 24. The electrodes 17 to 24 are made of the same material as that of the electrodes 13 to 16. The electrodes 17 to 20 are disposed in place of the electrodes 13 and 14. The electrodes 21 to 24 are disposed in place of the electrodes 15 and 16. Therefore, the pairs of electrodes 17 to 20 and the pairs of electrodes 21 to 24 are located on respective sides of the weights 6 in the y-direction.

An orthogonal axis E orthogonal to the driving axis D extends straight along the y-direction on the upper surface of the substrate 3, and the group of weights 6 is symmetric with respect to the orthogonal axis E. That is, the orthogonal axis E passes through the center Cw of the group of weights 6. The electrodes 17 and 19 are located adjacent to each other to be symmetric with each other with respect to the orthogonal axis E, and the electrodes 18 and 20 face each other through the electrodes 17 and 19 to be symmetric with each other with respect to the orthogonal axis E. Therefore, the pair of the electrodes 17 and 18 is symmetric with the pair of the electrodes 19 and 20 with respect to the orthogonal axis E. The electrodes 21 and 23 are located adjacent to each other to be symmetric with each other with respect to the orthogonal axis E, and the electrodes 22 and 24 face each other through the electrodes 21 and 23 to be symmetric with each other with respect to the orthogonal axis E. Therefore, the pair of the electrodes 21 and 22 is symmetric with the pair of the electrodes 23 and 24 with respect to the orthogonal axis E.

Further, the electrodes 17 and 21 are symmetrically placed with respect to the driving axis D, and the electrodes 18 and 22 are symmetrically placed with respect to the driving axis D. Therefore, the pair of the electrodes 17 and 18 and the pair of the electrodes 21 and 22 are symmetrically placed with respect to the driving axis D. The electrodes 19 and 23 are symmetrically placed with respect to the driving axis D, and the electrodes 20 and 24 are symmetrically placed with respect to the driving axis D. Therefore, the pair of the electrodes 19 and 20 and the pair of the electrodes 23 and 24 are symmetrically placed with respect to the driving axis D.

Each of the electrodes 17 to 24 is formed in a comb-like shape and has a plurality of tooth portions 17a, 18a, 19a, 20a, 21a, 22a, 23a or 24a (in this embodiment, two tooth portions) and a bus bar 17b, 18b, 19b, 20b, 21b, 22b, 23b or 24b connected with ends of the corresponding tooth portions. Each of the tooth portions 17a to 24a extends in the x-direction. Each of the bars 17b to 24b extends in the y-direction. The tooth portions 17a and 18a are alternately located at equal intervals along the y-direction between the bars 17b and 18b so as to face one another in they-direction. The tooth portions 19a and 20a are alternately located at equal intervals along the y-direction between the bars 19b and 20b so as to face one another in the y-direction. The tooth portions 21a and 22a are alternately located at equal intervals along the y-direction between the bars 21b and 22b so as to face one another in the y-direction. The tooth portions 23a and 24a are alternately located at equal intervals along the y-direction between the bars 23b and 24b so as to face one another in the y-direction.

Therefore, the pair of detecting electrodes 17 and 18 acts as a detecting unit, and the pair of detecting electrodes 19 and 20 acts as another detecting unit. In the same manner, the pair of detecting electrodes 21 and 22 acts as a detecting unit, and the pair of detecting electrodes 23 and 24 acts as another detecting unit.

With this structure of the sensor 51, not only the group of the electrodes 17 to 20 and the group of the electrodes 21 to 24 are symmetrically placed with respect to the driving axis D, but also the group of the electrodes 17, 18, 21 and 22 and the group of the electrodes 19, 20, 23 and 24 are symmetrically placed with respect to the orthogonal axis E. Therefore, even when the perturbative weights 6 generate scattered waves in response to the first surface acoustic waves excited by the electrodes 7 to 10, the sensor 51 reduce the adverse influence of the scattered waves on the detection of a yaw rate in the detecting electrodes 17 to 24.

Accordingly, in the same manner as the sensor 1, the sensor 51 can detect the yaw rate Ω of the yaw applied to the weights 6 with high precision. That is, a detecting electrode and another detecting electrode located on one side of the group of weights 6 in the y-direction may be symmetrically placed with respect to the orthogonal axis E.

Embodiment 3

Figure 10:
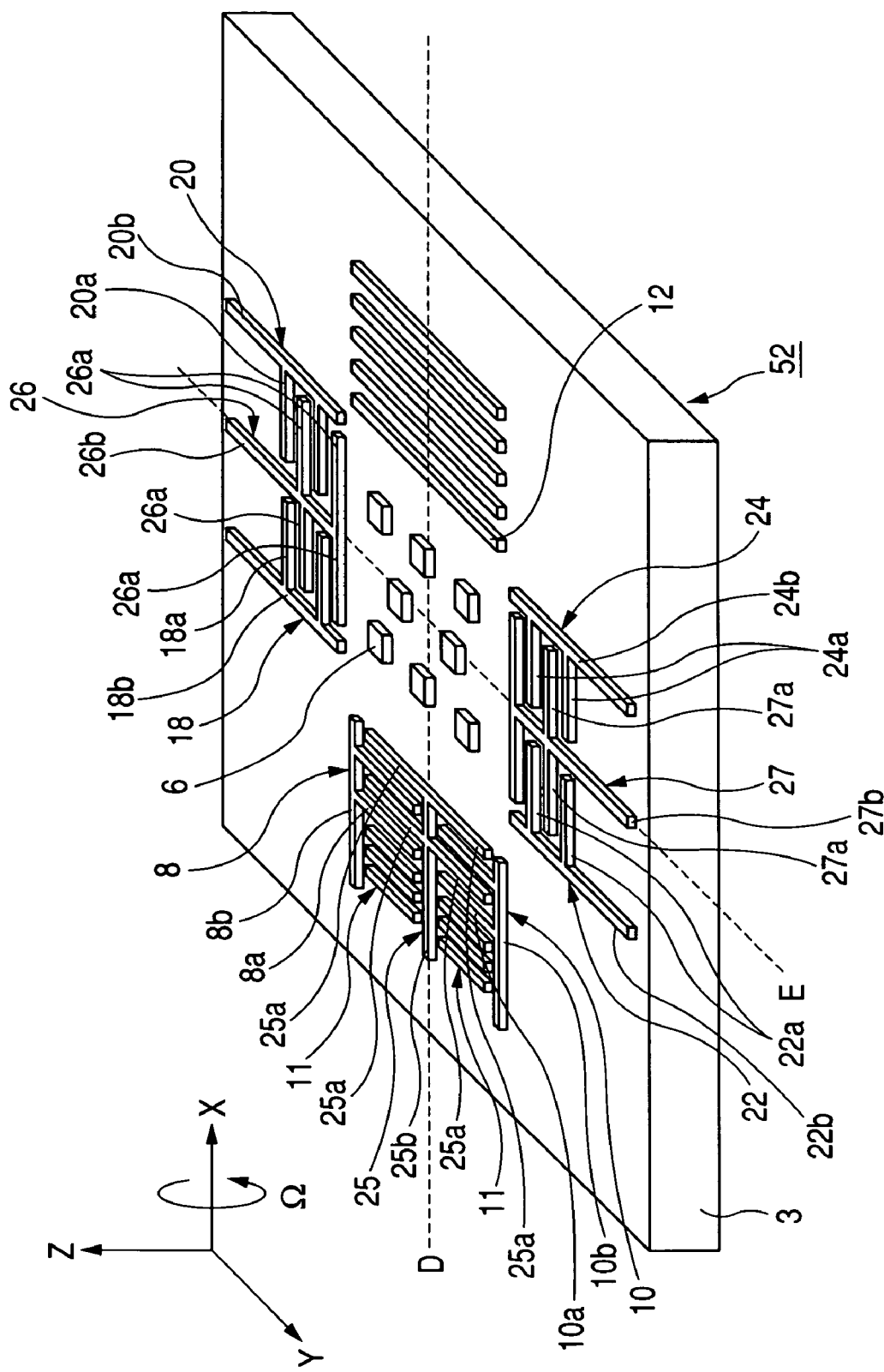
FIG. 10 is a perspective side view of a yaw rate sensor according to the third embodiment of the present invention.
Figure 11:
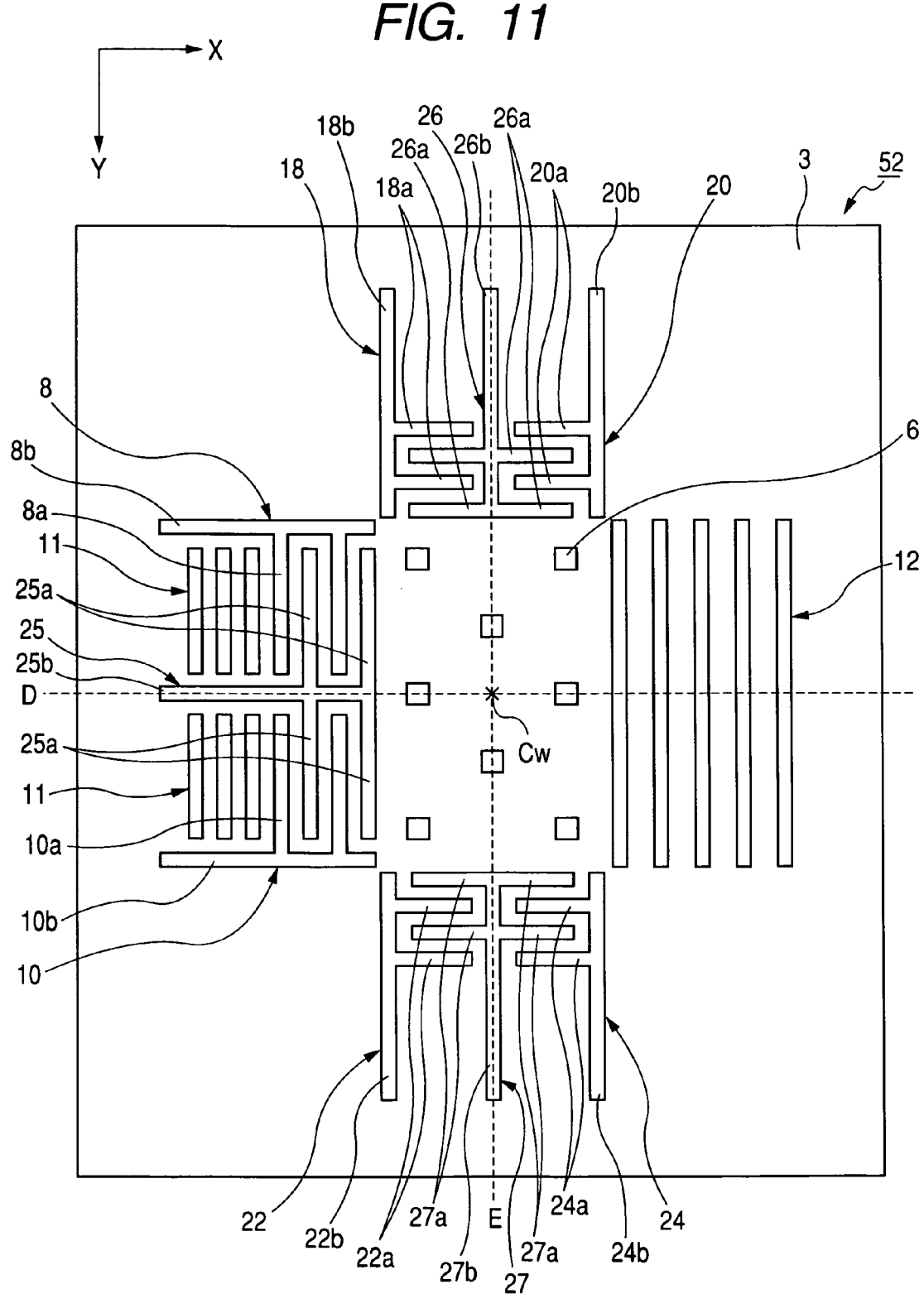
FIG. 11 is a plan view of the sensor shown in FIG. 10.

FIG. 10 is a perspective side view of a yaw rate sensor 52 according to the third embodiment, while FIG. 11 is a plan view of the sensor shown in FIG. 10.

As shown in FIG. 10 and FIG. 11, the yaw rate sensor 52 according to the third embodiment differs from the sensor 51 shown in FIG. 8 in that the sensor 52 has a common exciting electrode 25 acting as the exciting electrodes 7 and 9, a common detecting electrode 26 acting as the detecting electrodes 17 and 19, and a common detecting electrode 27 acting as the detecting electrodes 21 and 23. The exciting electrode 25 placed between the electrodes 8 and 10 is symmetric with respect to the driving axis D on the upper surface of the substrate 3. The detecting electrodes 26 and 27 are symmetrically placed with respect to the driving axis D on the upper surface of the substrate 3. Each of the detecting electrodes 26 and 27 is symmetric with respect to the orthogonal axis E.

The exciting electrode 25 has a plurality of tooth portions 25a (in this embodiment, four tooth portions) extending in the y-direction and a coupling bus bar 25b extending in the x-direction to be connected with ends of the tooth portions 25a. The tooth portions 8a and a first half part of the tooth portions 25a are alternately located at equal intervals along the x-direction between the bars 8b and 25b so as to face one another in the x-direction. The tooth portions 10a and a second half part of the tooth portions 25a are alternately located at equal intervals along the x-direction between the bars 10b and 25b so as to face one another in the x-direction.

Therefore, the electrode 8 and a half part of the electrode 25 act as a driving unit, and the electrode 10 and another half part of the electrode 25 act as another driving unit.

The detecting electrode 26 has a plurality of tooth portions 26a (in this embodiment, four tooth portions) extending in the x-direction and a coupling bus bar 26b extending in the y-direction to be connected with ends of the tooth portions 26a. The tooth portions 18a and a first half part of the tooth portions 26a are alternately located at equal intervals along the y-direction between the bars 18b and 26b so as to face one another in the y-direction. The tooth portions 20a and a second half part of the tooth portions 26a are alternately located at equal intervals along the y-direction between the bars 20b and 26b so as to face one another in the y-direction. Therefore, the electrode 18 and a half part of the electrode 26 act as a detecting unit, and the electrode 20 and another half part of the electrode 26 act as another detecting unit.

The detecting electrode 27 has a plurality of tooth portions 27a (in this embodiment, four tooth portions) extending in the x-direction and a coupling bus bar 27b extending in the y-direction to be connected with ends of the tooth portions 27a. The tooth portions 22a and a first half part of the tooth portions 27a are alternately located at equal intervals along the y-direction between the bars 22b and 27b so as to face one another in the y-direction. The tooth portions 24a and a second half part of the tooth portions 27a are alternately located at equal intervals along the y-direction between the bars 24b and 27b so as to face one another in the y-direction. Therefore, the electrode 23 and a half part of the electrode 27 act as a detecting unit, and the electrode 24 and another half part of the electrode 27 act as another detecting unit.

With this structure of the sensor 52, the exciting electrodes 8, 10 and 25 generate two first surface acoustic waves in the same manner as the exciting electrodes 7 to 10 shown in FIG. 8 so as to oscillate the weights 6, and a second surface acoustic wave transmitted in the y-direction is generated in response to oscillations of the weights 6. The set of detecting electrodes 18, 20 and 26 detects the second surface acoustic wave in the same manner as the set of detecting electrodes 17 to 20 shown in FIG. 8, and the set of detecting electrodes 22, 24 and 27 detects the second surface acoustic wave in the same manner as the set of detecting electrodes 21 to 24 shown in FIG. 8. Further, the adverse influence of scattered waves generated in the weights 6 are reduced in the same manner as in the sensor 51 shown in FIG. 8.

Accordingly, in the same manner as in the sensor 51, the sensor 52 can detect a yaw rate applied to the weights 6 with high precision.

Further, because the electrodes 25 to 27 are disposed in the sensor 52 in place of the electrodes 7, 9, 17, 19, 21 and 23, a small-sized yaw rate sensor can be manufactured.

Embodiment 4

In the sensor 52 shown in FIG. 10 according to the third embodiment, the propagation velocity (i.e., acoustic velocity) of the first surface acoustic waves propagated under the bus bars 8b, 10b and 25b of the electrodes 8, 10 and 25 differs from that of the first surface acoustic waves propagated under the electrodes 8, 10 and 25 other than the bus bars. Therefore, the phase of the first surface acoustic waves propagated under the bus bars 8b, 10b and 25b is differentiated from the phase of the first surface acoustic waves propagated under the electrodes 8, 10 and 25 other than the bus bars. In this case, the phase of scattered waves derived from the first surface acoustic waves propagated under the bus bars 8b, 10b and 25b is sometimes differentiated from that derived from the first surface acoustic waves propagated under the electrodes 8, 10 and 25 other than the bus bars.

Further, the propagation velocity (i.e., acoustic velocity) of the second surface acoustic wave propagated under the bus bars 18b, 20b, 22b, 24b, 26b and 27b of the electrodes 18, 20, 22, 24, 26 and 27 differs from that of the second surface acoustic wave propagated under the electrodes 18, 20, 22, 24, 26 and 27 other than those bus bars. Therefore, the phase of the second surface acoustic wave propagated under the bus bars 18b, 20b, 22b, 24b, 26b and 27b is differentiated from the phase of the second surface acoustic wave propagated under the electrodes 18, 20, 22, 24, 26 and 27 other than those bus bars.

When the scattered waves are transmitted in the y-direction at various phases, it is difficult to cancel out the scattered waves. In this fourth embodiment, to uniformly adjust the phase of scattered waves and the phase of the surface acoustic waves, the weights 6 are located in a specific area.

Figure 12:
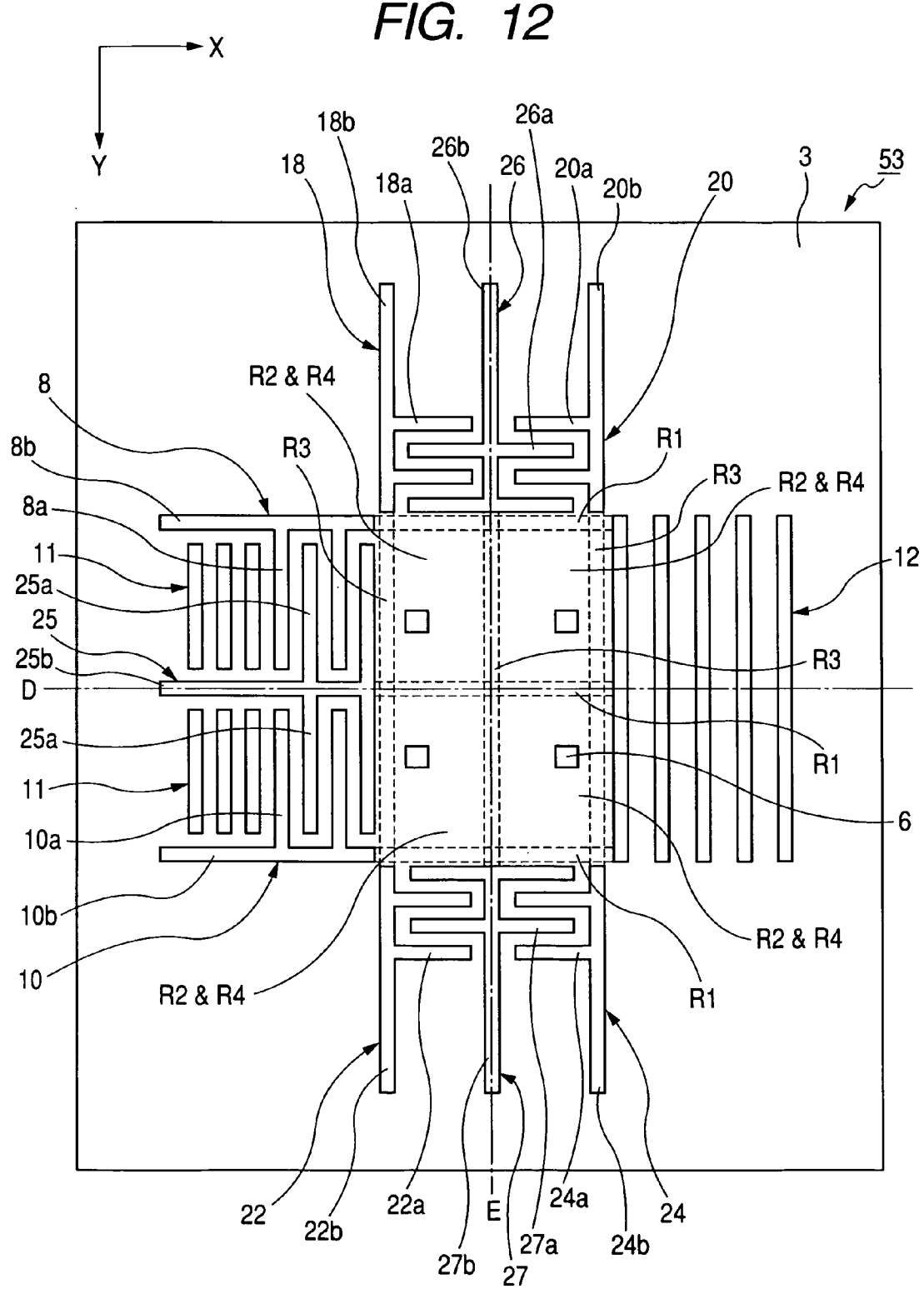
FIG. 12 is a view schematically showing perturbative weights located in a specific area according to the fourth embodiment of the present invention.

FIG. 12 is a view schematically showing perturbative weights located in a specific area according to the fourth embodiment.

As shown in FIG. 12, the weights 6 are located to face the exciting electrodes 8, 10 and 25 in the x-direction and to face the detecting electrodes 18, 20 and 26 in the y-direction. A weight area facing the exciting electrodes 8, 10 and 25 in the x-direction and facing the detecting electrodes 18, 20 and 26 in the y-direction is partitioned into three first weight regions R1, through which straight lines prolonged in the x-direction from the bus bars 8b, 10b and 25b of the exciting electrodes 8, 10 and 25 pass, and two second weight regions R2 through which straight lines prolonged in the x-direction from the tooth portions 8a, 10a and 25a of the exciting electrodes 8, 10 and 25 pass. Each of the second weight regions R2 is placed between two of the first weight regions R1. The weight area is also partitioned into three third weight regions R3, through which straight lines prolonged in the y-direction from the bus bars 18b, 20b, 22b, 24b, 26b and 27b of the detecting electrodes 18, 20, 22, 24, 26 and 27 pass, and two fourth weight regions R4 through which straight lines prolonged in the y-direction from the tooth portions 18a, 20a, 22a, 24a, 26a and 27a of the detecting electrodes 18, 20, 22, 24, 26 and 27 pass. Each of the fourth weight regions R4 is placed between two of the third weight regions R3. The perturbative weights 6 are located in four specific weight regions in which the second weight regions overlap with the fourth weight regions.

Figure 13:
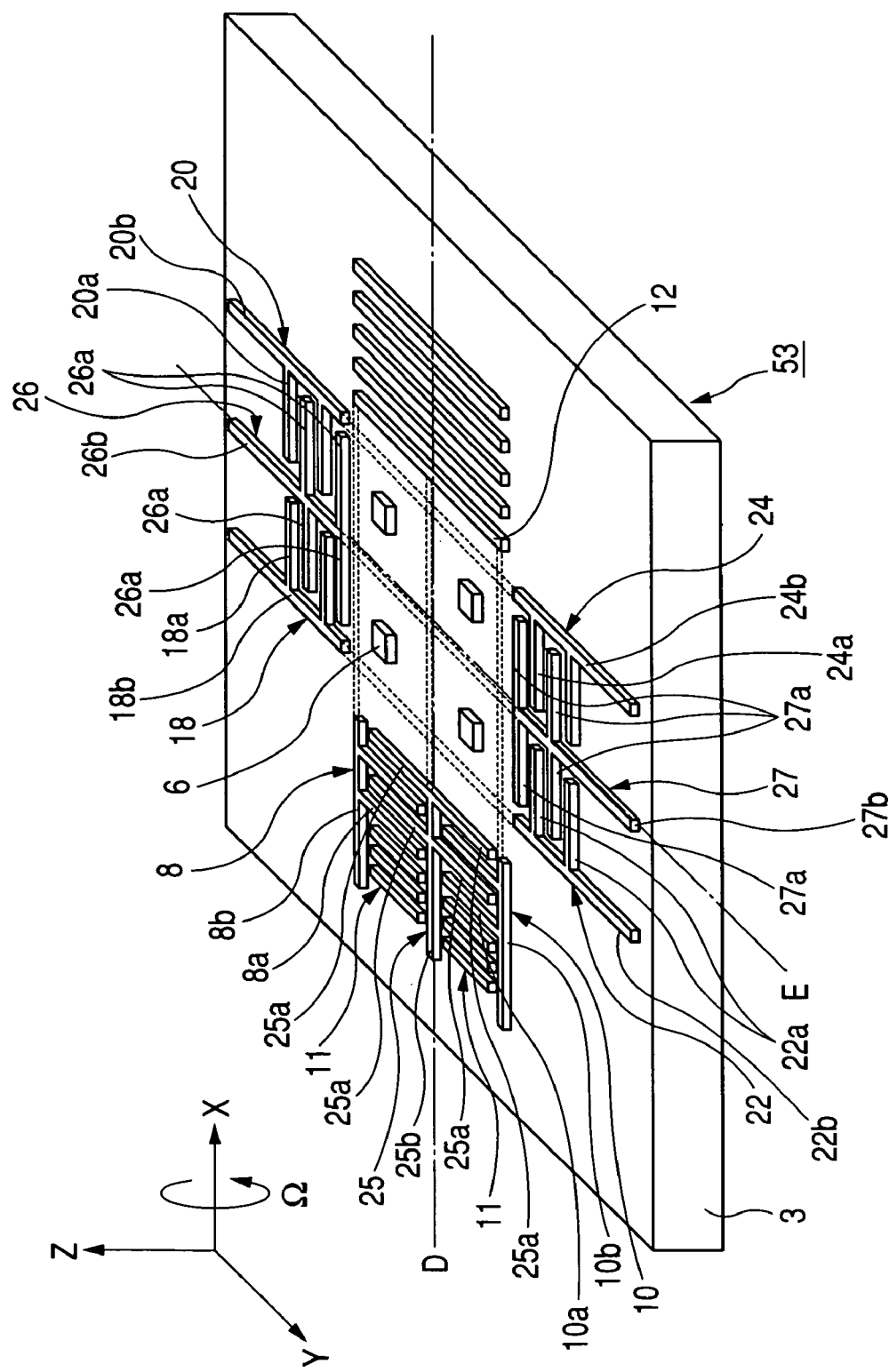
FIG. 13 is a perspective side view of a yaw rate sensor according to the fourth embodiment.

FIG. 13 is a perspective side view of a yaw rate sensor 53 according to the fourth embodiment.

As shown in FIG. 13, the yaw rate sensor 53 according to the fourth embodiment differs from the sensor 52 shown in FIG. 10 in that the perturbative weights 6 are disposed in an overlap region of the second weight regions and the fourth weight regions on the upper surface of the substrate 3 while the group of weights 6 is symmetric with respect to each of the driving axis D and the orthogonal axis E. That is, none of straight lines prolonged in the x-direction from the bus bars 8b, 10b and 25b of the exciting electrodes 8, 10 and 25 pass through the weights 6, and none of straight lines prolonged in the y-direction from the bus bars 18b, 20b, 22b, 24b, 26b and 27b of the detecting electrodes 18, 20, 22, 24, 26 and 27 pass through the weights 6.

With this structure of the sensor 53, the weights 6 are placed not to be across any of straight lines prolonged in the x-direction from the bus bars 8b, 10b and 25b of the exciting electrodes 8, 10 and 25. Therefore, portions of the first surface acoustic waves oscillating the respective weights 6 have substantially the same phase, so that scattered waves generated in the respective weights 6a have substantially the same phase.

Further, the weights 6 are placed not to be across any of straight lines prolonged in the y-direction from the bus bars 18b, 20b, 22b, 24b, 26b and 27b of the detecting electrodes 18, 20, 22, 24, 26 and 27. Therefore, portions of the second surface acoustic wave excited and generated in response to the oscillations of the weights 6 and detected by the detecting electrodes 18, 20, 22, 24, 26 and 27 have substantially the same phase, and the scattered waves propagated in the y-direction have substantially the same phase.

Accordingly, the scattered waves can be reliably cancelled out, so that the sensor 53 can detect a yaw rate applied to the weights 6 with higher precision.

In this embodiment, the weights 6 are located in the area specified above in case of the arrangement of the electrodes of the sensor 52. However, the weights 6 of the sensor 51 shown in FIG. 8 may be located in the specified area. More specifically, a weight area facing the exciting electrodes 7 to 10 in the x-direction and facing the detecting electrodes 13 to 16 in the y-direction is partitioned into first weight regions, through which straight lines prolonged in the x-direction from the bus bars 7b, 8b, 9b and 10b of the exciting electrodes 7 to 10 pass, and second weight regions, through which straight lines prolonged in the x-direction from the tooth portions 7a, 8a, 9a and 10a of the exciting electrodes 7 to 10 pass. Each of the second weight regions is placed between two of the first weight regions. The weight area is also partitioned into third weight regions, through which straight lines prolonged in the y-direction from the bus bars 17b, 18b, 19b and 20b of the detecting electrodes 17 to 20 pass, and fourth weight regions, through which straight lines prolonged in the y-direction from the tooth portions 17a, 18a, 19a and 20a of the detecting electrodes 17 to 20 pass. Each of the fourth weight regions is placed between two of the third weight regions. A plurality of perturbative weights 6 are located in specific weight regions in which the second weight regions overlap with the fourth weight regions.

Embodiment 5

In the sensor 52 shown in FIG. 10 according to the third embodiment, the tooth portions 8a and 25a of the electrodes 8 and 25 are alternately arranged on a first alternation area of the upper surface of the substrate 3, and the tooth portions 10a and 25a of the electrodes 10 and 25 are alternately arranged on a second alternation area of the upper surface of the substrate 3. The propagation velocity (i.e., acoustic velocity) of the first surface acoustic waves propagated through the first and second alternation areas differs from that of the first surface acoustic waves propagated through the upper surface of the substrate 3 other than the first and second alternation areas under the electrodes 8, 10 and 25. Therefore, the phase of the first surface acoustic waves propagated through the first and second alternation areas is differentiated from the phase of the first surface acoustic waves propagated through the upper surface of the substrate 3 other than the first and second alternation areas under the electrodes 8, 10 and 25. In this case, the phase of scattered waves derived from the first surface acoustic waves propagated through the first and second alternation areas is sometimes differentiated from that of other scattered waves.

Further, the tooth portions 18a and 26a of the electrodes 18 and 26 alternately arranged and the tooth portions 22a and 27a of the electrodes 22 and 27 alternately arranged are located on a third alternation area of the upper surface of the substrate 3, and the tooth portions 20a and 26a of the electrodes 20 and 26 alternately arranged and the tooth portions 24a and 27a of the electrodes 24 and 27 alternately arranged are located on a fourth alternation area of the upper surface of the substrate 3. The propagation velocity (i.e., acoustic velocity) of the second surface acoustic wave propagated through the third and fourth alternation areas differs from that of the second surface acoustic wave propagated through the upper surface of the substrate 3 other than the third and fourth alternation areas under the electrodes 18, 20, 22, 24, 26 and 27. Therefore, the phase of the second surface acoustic wave propagated through the third and fourth alternation areas is differentiated from the phase of the second surface acoustic wave propagated through the upper surface of the substrate 3 other than the third and fourth alternation areas under the electrodes 18, 20, 22, 24, 26 and 27.

When scattered waves are transmitted in the y-direction at various phases, it is difficult to cancel out the scattered waves. In this fifth embodiment, to uniformly adjust the phase of scattered waves and the phase of the surface acoustic waves, the weights 6 are located in a specific area.

Figure 14:
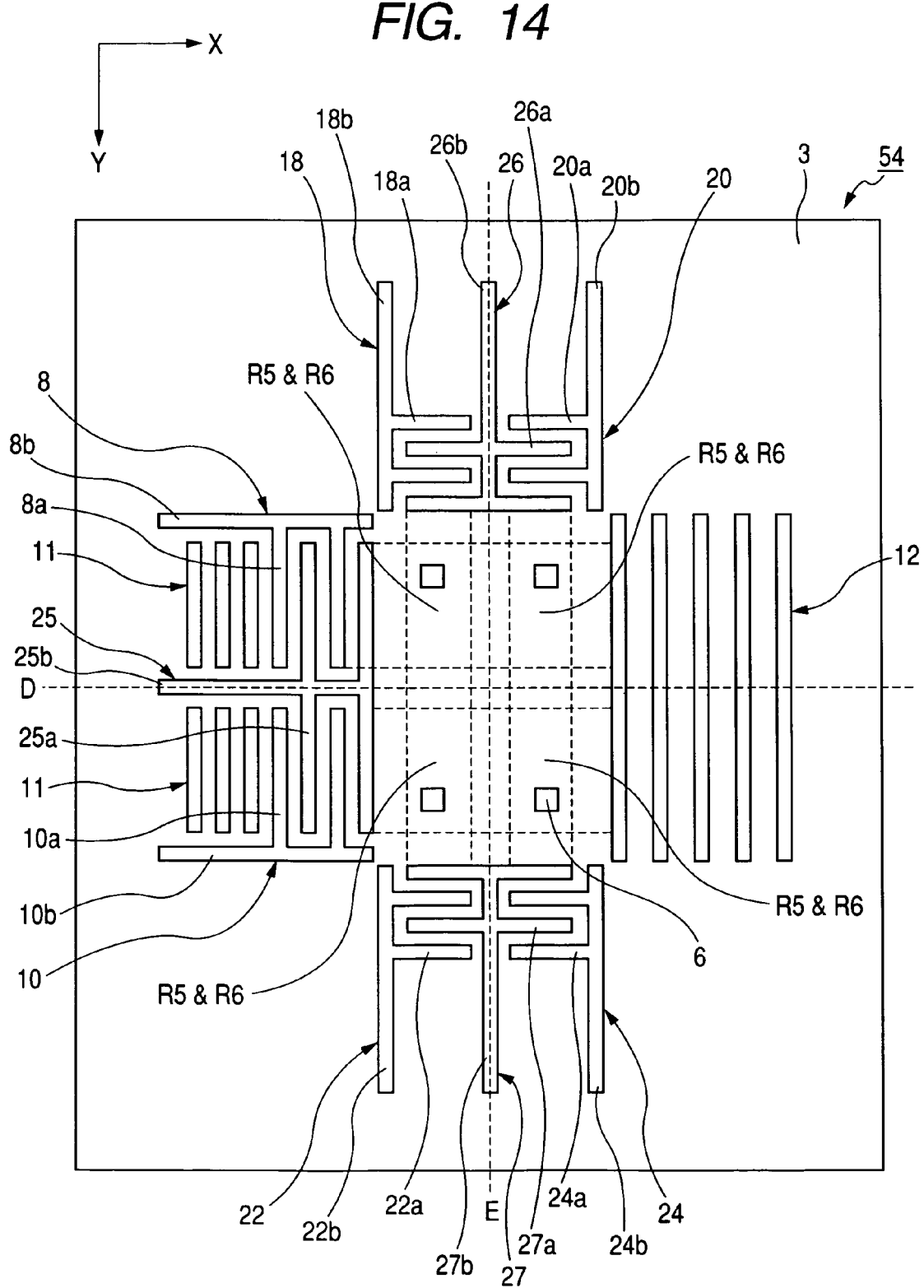
FIG. 14 is a view schematically showing perturbative weights located in a specific area according to the fifth embodiment of the present invention.

FIG. 14 is a view schematically showing perturbative weights located in a specific area according to the fifth embodiment.

As shown in FIG. 14, a plurality of perturbative weights 6 are located in both a first tooth alternation region R5 ranging in the y-direction from open ends of the tooth portions 8a to open ends of the first half part of tooth portions 25a and another first tooth alternation region R5 ranging in the y-direction from open ends of the tooth portions 10a to open ends of the second half part of tooth portions 25a. Further, the weights 6 are limitedly located in both a second tooth alternation region R6 ranging in the x-direction from open ends of the tooth portions 18a to open ends of the first half part of tooth portions 26a and another second tooth alternation region R6 ranging in the x-direction from open ends of the tooth portions 20a to open ends of the second half part of tooth portions 26a. The first tooth alternation regions R5 are included in the second weight regions shown in FIG. 12. The second tooth alternation regions R6 are included in the fourth weight regions shown in FIG. 12. The weights 6 are located in four specific weight regions in which the first tooth alternation regions R5 overlaps with the second tooth alternation regions R6.

Figure 15:
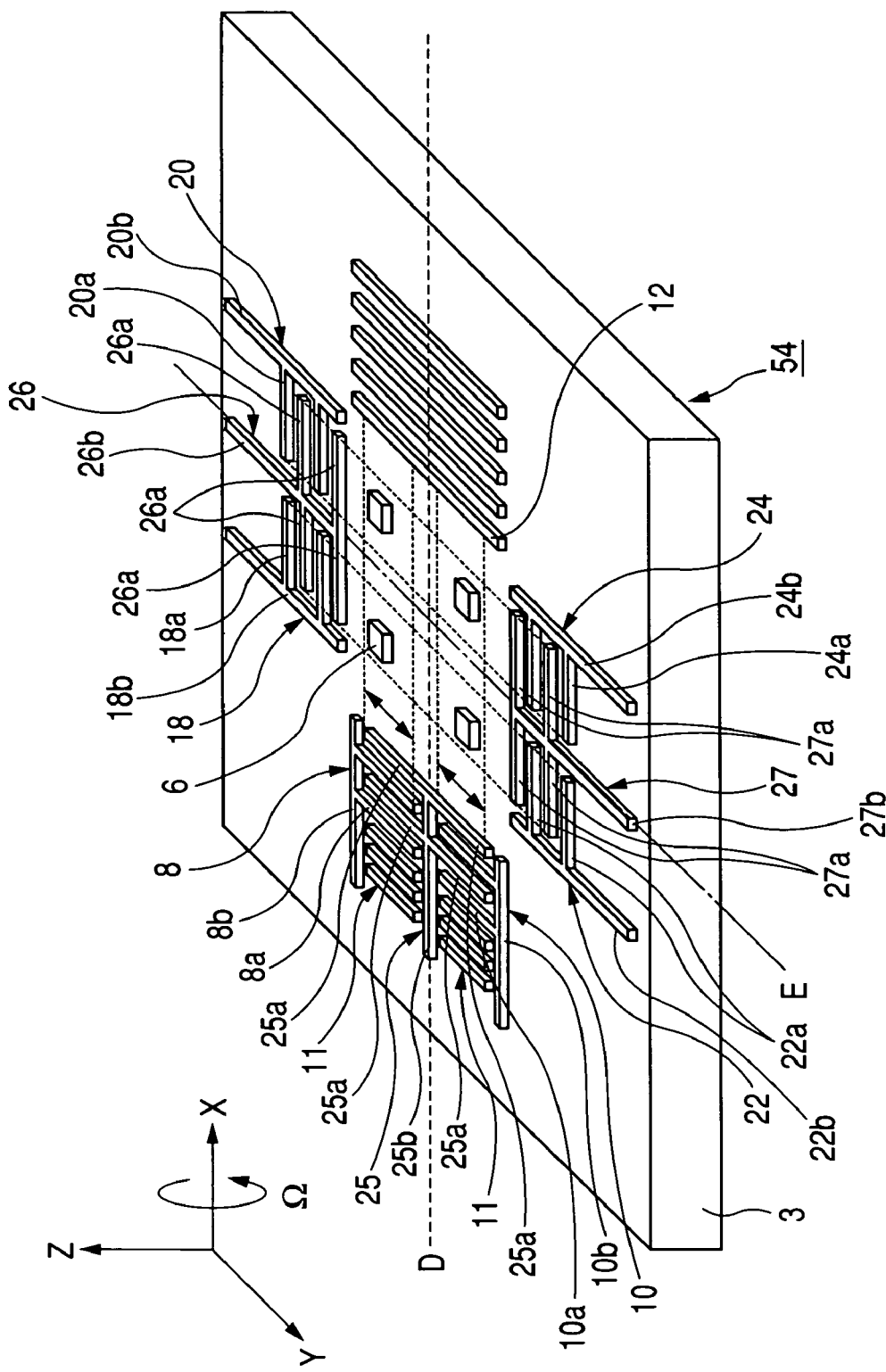
FIG. 15 is a perspective side view of a yaw rate sensor according to the fifth embodiment.

FIG. 15 is a perspective side view of a yaw rate sensor 54 according to the fifth embodiment.

As shown in FIG. 15, the yaw rate sensor 54 according to the fifth embodiment differs from the sensor 52 shown in FIG. 10 in that the perturbative weights 6 are disposed in the specific weight regions on the upper surface of the substrate 3 while the group of weights 6 is symmetric with respect to each of the driving axis D and the orthogonal axis E.

With this structure of the sensor 54, because the weights 6 are oscillated by a first surface acoustic wave excited and generated in the tooth portions 8a and 25a of the exciting electrodes 8 and 25 alternately arranged and/or another first surface acoustic wave excited and generated in the tooth portions 10a and 25a of the exciting electrodes 10 and 25 alternately arranged, portions of the first surface acoustic waves oscillating the respective weights 6 have substantially the same phase. Therefore, scattered waves generated in the respective weights 6a have substantially the same phase.

Further, the second surface acoustic wave and the scattered waves transmitted in the y-direction interact with the tooth portions 18a and 26a of the detecting electrodes 18 and 26 alternately arranged and the tooth portions 22a and 27a of the detecting electrodes 22 and 27 alternately arranged, and/or the second surface acoustic wave and the scattered waves transmitted in the y-direction interact with the tooth portions 20a and 26a of the detecting electrodes 20 and 26 alternately arranged and the tooth portions 24a and 27a of the detecting electrodes 24 and 27 alternately arranged. Therefore, portions of the second surface acoustic wave have substantially the same phase, and the scattered waves propagated in the y-direction have substantially the same phase.

Accordingly, the scattered waves can be reliably cancelled out, so that the sensor 54 can detect a yaw rate applied to the weights 6 with higher precision.

In this embodiment, the weights 6 are located in the specific area in case of the arrangement of the electrodes of the sensor 52. However, the weights 6 of the sensor 51 shown in FIG. 8 may be located in a specific area. More specifically, each of the weights 6 is placed in a specific weight region wherein a first weight region overlaps with a second weight region. The first weight region includes both a first tooth alternation region ranging from open ends of the tooth portions 7a to open ends of the tooth portions 8a in the y-direction and another first tooth alternation region ranging from open ends of the tooth portions 9a to open ends of the tooth portions 10a in the y-direction. The second weight region includes both a second tooth alternation region ranging from open ends of the tooth portions 17a to open ends of the tooth portions 18a in the x-direction and another second tooth alternation region ranging from open ends of the tooth portions 19a to open ends of the tooth portions 20a in the x-direction.

Embodiment 6

Figure 16:
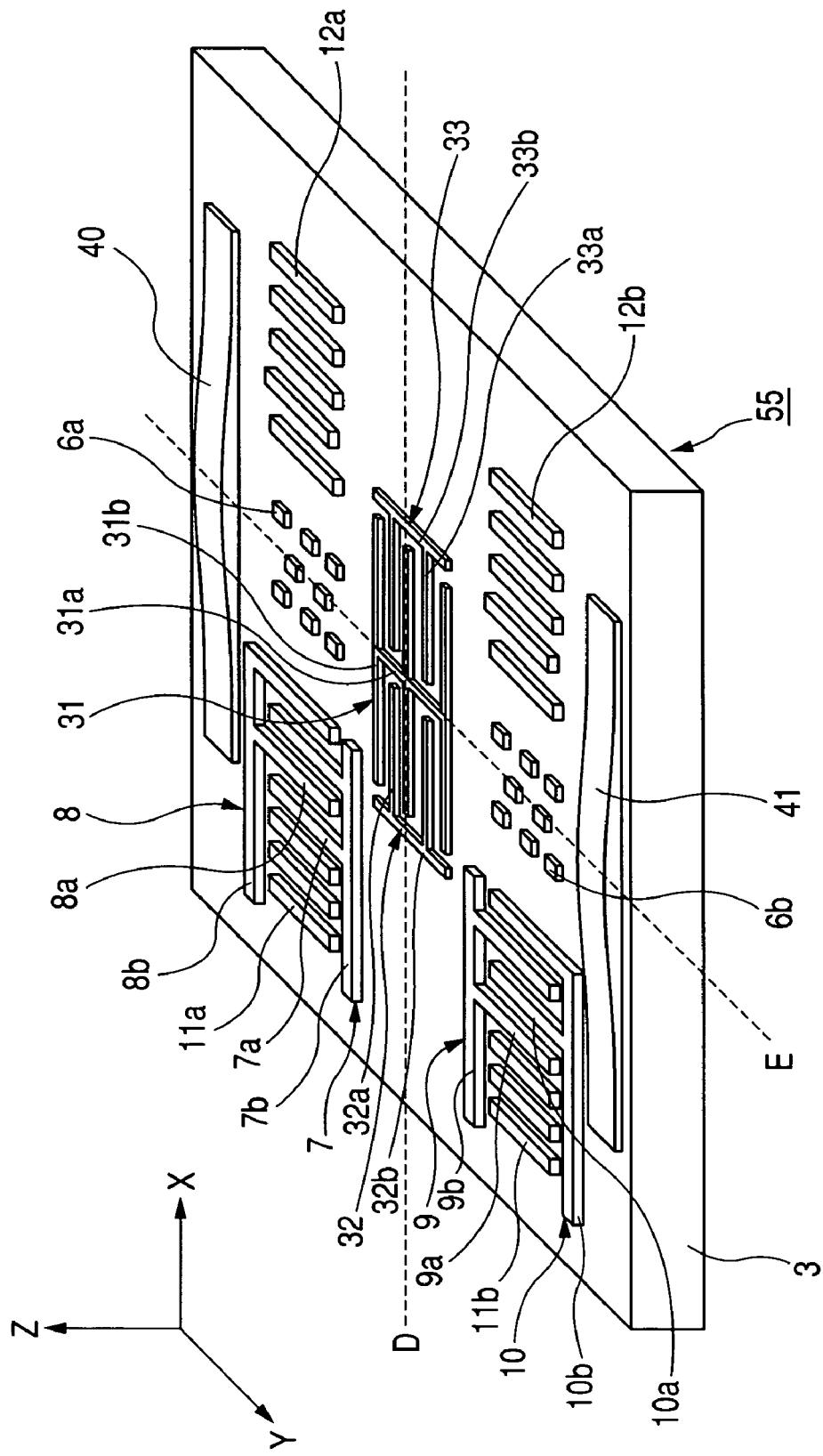
FIG. 16 is a perspective side view of a yaw rate sensor according to the sixth embodiment of the present invention.

FIG. 16 is a perspective side view of a yaw rate sensor 55 according to the sixth embodiment.

As shown in FIG. 16, the yaw rate sensor 55 according to the sixth embodiment has a plurality of first perturbative weights 6a arranged in a checkerboard pattern, the exciting electrodes 7 and 8 disposed to face the first side of the square of the weights 6a, the reflecting bars 11a of the reflector 11, and a reflector 12a disposed to face the second side of the weights 6a opposite to the first side. The weights 6a, the electrodes 7 and 8, the reflecting bars 11a of the reflector 11 and the reflector 12a are disposed on one side of the driving axis D in the y-direction.

The group of weights 6a formed in a square shape is symmetric with respect to the orthogonal axis E. The electrodes 7 and 8 excites and generates a first surface acoustic wave transmitted in the x-direction. The reflecting bars 11a of the reflector 11 and the reflector 12a reflect the first surface acoustic wave between the reflectors 11 and 12a to transmit the first surface acoustic wave as a standing wave. The weights 6a are oscillated in the z-direction by the first surface acoustic wave and are oscillated in the y-direction in response to a yaw applied to the weights 6a.

The sensor 55 further has a plurality of second perturbative weights 6b arranged in a checkerboard pattern, the exciting electrodes 9 and 10 disposed to face the first side of the square of the weights 6b, the reflecting bars 11b of the reflector 11, and a reflector 12b disposed to face the second side of the weights 6b opposite to the first side. The weights 6b, the electrodes 9 and 10, the reflecting bars 11b of the reflector 11 and the reflector 12b are disposed on the other side of the driving axis D in the y-direction.

The group of weights 6b formed in a square shape is symmetric with respect to the orthogonal axis E. The group of weights 6b and the group of weights 6a are symmetrically placed with respect to the driving axis D. The pair of exciting electrodes 9 and 10 and the pair of exciting electrodes 7 and 8 are symmetrically placed with respect to the driving axis D. The group of reflecting bars 11b and the group of reflecting bars 11a are symmetrically placed with respect to the driving axis D. The electrodes 9 and 10 excite and generate another first surface acoustic wave transmitted in the x-direction. The reflecting bars 11b of the reflector 11 and the reflector 12b reflect the first surface acoustic wave between the reflectors 11 and 12b to transmit the first surface acoustic wave as a standing wave. The weights 6b are oscillated in the z-direction by the first surface acoustic wave and are oscillated in the y-direction in response to a yaw applied to the weights 6b.

The sensor 55 further has a first detecting electrode 31, a second detecting electrode 32 and a third detecting electrode 33 between the group of the first weights 6a and the group of the first weights 6b. Each of the electrodes 31 to 33 is formed in a comb-like shape. The electrode 31 is symmetric with respect to each of the driving axis D and the orthogonal axis E. Each of the electrodes 32 and 33 is symmetric with respect to the driving axis D. The electrodes 32 and 33 are symmetrically placed with respect to the orthogonal axis E.

The electrode 31 has a plurality of tooth portions 31a and a bus bar 31b connected with ends of the tooth portions 31a. The electrode 32 has a plurality of tooth portions 32a and a bus bar 32b connected with ends of the tooth portions 32a. The electrode 33 has a plurality of tooth portions 33a and a bus bar 33b connected with ends of the tooth portions 33a. Each of the tooth portions extends in the x-direction. Each of the bars extends in the y-direction. The tooth portions 32a and a half part of the tooth portions 31a are alternately arranged along the y-direction. The tooth portions 33a and the other half part of the tooth portions 31a are alternately arranged along the y-direction.

The electrodes 31 to 33 detect a second surface acoustic wave excited by the weights 6a and another second surface acoustic wave excited by the weights 6b in response to a yaw applied to the weights 6a and 6b.

The sensor 55 may have a first sound absorbing member 40 disposed on one side of the driving axis D in the y-direction to place the weights 6a between the group of detecting electrodes 31 to 33 and the member 40 and a second sound absorbing member 41 disposed on the other side of the driving axis D in the y-direction to place the weights 6b between the group of detecting electrodes 31 to 33 and the member 41. The member 40 absorbs the second acoustic wave and scattered waves transmitted from the weights 6a to the side opposite to the side of the detecting electrodes 31 to 33. The member 41 absorbs the second acoustic wave and scattered waves transmitted from the weights 6b to the side opposite to the side of the detecting electrodes 31 to 33. Each of the members 40 and 41 is formed by coating the upper surface of the substrate 3 with a sound absorbing material.

With this structure of the sensor 55, an operation of the sensor 55 will be described.

A first alternating voltage V1 (V1=B×cos ωt) is applied to each of the exciting electrodes 7 and 10, and a second alternating voltage V2 (V2=B×cos (ωt−π)) is applied to each of the exciting electrodes 8 and 9. The first and second alternating voltages have the same amplitude (V2=−V1) and the same angular frequency ω, but the phases of the first and second alternating voltages are shifted from each other by π (i.e., a half of one cycle 2π/ω). Therefore, a first surface acoustic wave excited in the pair of electrodes 7 and 8 has a phase opposite to a phase of another first surface acoustic wave excited in the pair of electrodes 9 and 10.

In this case, the phase of the first scattered waves generated by the weights 6a and transmitted to the electrodes 31 to 33 is opposite to the phase of the second scattered waves generated by the weights 6b and transmitted to the electrodes 31 to 33. Therefore, the first scattered waves and the second scattered waves are cancelled out under the electrodes 31 to 33. In contrast, a second surface acoustic wave generated by the weights 6a in response to a yaw applied to the weights 6a and 6b and transmitted to the electrodes 31 to 33 has the same phase as that of another second surface acoustic wave generated by the weights 6b in response to the yaw and transmitted to the electrodes 31 to 33. Therefore, the second surface acoustic waves are resonated with each other under the electrodes 31 to 33 so as to enlarge the amplitudes of the second surface acoustic waves.

Further, the scattered waves generated by the weights 6a and 6b are transmitted toward the side opposite to the side of the electrodes 31 to 33. However, these scattered waves are absorbed by the members 40 and 41. Therefore, no adverse influence of the scattered waves is exerted on the detection of a yaw rate.

Accordingly, because the first scattered waves generated by the weights 6a and the second scattered waves generated by the weights 6b are cancelled out under the electrodes 31 to 33, the sensor 55 can detect the yaw rate applied to the weights 6a and 6b with high precision without receiving any adverse influence of the scattered waves.

Further, because the second surface acoustic waves generated by the weights 6a and 6b are resonated with each other under the electrodes 31 to 33, the sensor 55 can detect the yaw rate with higher precision.

Moreover, because no adverse influence of the scattered waves transmitted toward the side opposite to the side of the electrodes 31 to 33 is exerted on the detection of the yaw rate, the sensor 55 can detect the yaw rate with higher precision.

These embodiments should not be construed as limiting the present invention to structures of those embodiments, and the structure of this invention may be combined with that based on the prior art. For example, the substrate 3 is made of a piezoelectric material. However, the substrate 3 may have a piezoelectric film formed on the surface of a semiconductor substrate. The surface acoustic waves are transmitted through the piezoelectric film.

Further, in these embodiments, the sensor has the reflectors 11 and 12, so that the reflectors 11 and 12 effectively generate a standing wave. However, the sensor may have no reflector.

Moreover, in these embodiments, the sensor has the detecting electrodes on each of the both sides in the y-direction, so that the detecting electrodes on one side detect the yaw rate in the same manner as the detecting electrodes on the other side. However, the sensor may have a pair of detecting electrodes only on one side in the y-direction.

Furthermore, in these embodiments, the exciting electrodes are placed only on one side of the weights 6 to be symmetric with respect to the driving axis D. However, the exciting electrodes symmetrically placed with respect to the driving axis D may be placed on each of both sides of the weights 6 in the x-direction.

Still further, in these embodiments, each exciting electrode is formed in a comb-like shape. However, the shape of each pair of exciting electrodes having tooth portions alternately arranged may be arbitrarily designed on condition that the pair of exciting electrodes is symmetric with respect to the driving axis D.

What is claimed is:

1. A yaw rate sensor of a surface acoustic wave, comprising:
   a substrate;
   an exciting electrode that transmits a surface acoustic wave through a surface of the substrate to generate a standing wave from the surface acoustic wave in an area of the surface of the substrate;
   a plurality of perturbative weights, disposed on the area of the surface of the substrate in which the standing wave is formed, which is oscillated by the standing wave on the substrate; and
   a detecting unit that is formed for the plurality of perturbative weights on the substrate in a direction orthogonal to a propagation direction of the surface acoustic wave, which detects an acoustic wave which is generated based on a Coriolis force induced in response to a yaw applied to the plurality of perturbative weights, wherein
   the exciting electrode, the plurality of perturbative weights, and the detecting unit are, respectively, line-symmetric with respect to a driving axis which is a straight line extending along the propagation direction of the surface acoustic wave and passes through a center position of the plurality of perturbative weights.

2. The yaw rate sensor of the surface acoustic wave according to claim 1, wherein the exciting electrode has a first set of exciting electrodes and a second set of exciting electrodes, and the sets of exciting electrodes are arranged line-symmetrically to each other with respect to the driving axis.

3. The yaw rate sensor of the surface acoustic wave according to claim 2, wherein each of the set of exciting electrodes and the set of exciting electrodes has a first exciting electrode with a first tooth portion and a second exciting electrode with a second tooth portion arranged opposite to the first tooth portion.

4. The yaw rate sensor of the surface acoustic wave according to claim 3, wherein the first exciting electrode of the two sets of exciting electrodes has a first bus bar connected with an end of the first tooth portion, and the second exciting electrode of the two sets of exciting electrodes has a second bus bar connected with an end of the second tooth portion which is placed on a side different from another side on which the end of the first tooth portion is connected with the first bus bar.

5. The yaw rate sensor of the surface acoustic wave according to claim 4, wherein the plurality of perturbative weights is arranged in an area placed between an extending line of the first bus bar and an extending line of the second bus bar while avoiding areas placed on the extending lines.

6. The yaw rate sensor of the surface acoustic wave according to claim 5, wherein the first tooth portion faces the second tooth portion along the propagation direction in a facing area defined between another end of the first tooth portion and another end of the second tooth portion in a direction orthogonal to the propagation direction, and the plurality of perturbative weights is arranged in the facing area.

7. The yaw rate sensor of the surface acoustic wave according to claim 3, wherein an end of a first tooth portion in the first exciting electrode of the two sets of exciting electrodes is connected with a first bus bar, and the second exciting electrode of the two sets of exciting electrodes has a second bus bar connected with an end of the second tooth portion which is placed on a side different from another side on which the end of the first tooth portion is connected with the first bus bar.

8. The yaw rate sensor of the surface acoustic wave according to claim 7, wherein the plurality of perturbative weights is arranged in an area placed between an extending line of the first bus bar and an extending line of the second bus bar while avoiding areas placed on the extending lines.

9. The yaw rate sensor of the surface acoustic wave according to claim 8, wherein the first tooth portion faces the second tooth portion along the propagation direction in a facing area defined between another end of the first tooth portion and another end of the second tooth portion in a direction orthogonal to the propagation direction, and the plurality of perturbative weights is arranged in the facing area.

10. The yaw rate sensor of the surface acoustic wave according to claim 1, wherein an orthogonal axis passes through a center position of the plurality of perturbative weights and extends straight along a direction orthogonal to the driving axis, and the detecting unit is line-symmetrically arranged with respect to the orthogonal axis.

11. The yaw rate sensor of the surface acoustic wave according to claim 10, wherein the detecting unit has a first detecting member and a second detecting member to place the plurality of perturbative weights between the detecting members.

12. The yaw rate sensor of the surface acoustic wave according to claim 11, wherein each of the first detecting member and the second detecting member of the detecting unit placing the perturbative weights between the detecting members has a first set of detecting electrodes and a second set of detecting electrodes, and the sets of detecting electrodes in each of the detecting members are line-symmetrically placed with respect to the orthogonal axis.

13. The yaw rate sensor of the surface acoustic wave according to claim 12, wherein the detecting unit has a first detecting electrode with a first tooth portion extending along a direction parallel to the driving axis and a second detecting electrode with a second tooth portion facing the first tooth portion.

14. The yaw rate sensor of the surface acoustic wave according to claim 13, wherein the first detecting electrode of the detecting unit has a bus bar connected with an end of the first tooth portion, and the second tooth portion of the detecting unit has a bus bar connected with an end of the second tooth portion which is placed on a side different from another side on which the end of the tooth portion is connected with the bus bar.

15. The yaw rate sensor of the surface acoustic wave according to claim 14, wherein the plurality of perturbative weights is arranged in an area placed between an extending line of the bus bar and an extending line of the bus bar while avoiding areas placed on the extending lines.

16. The yaw rate sensor of the surface acoustic wave according to claim 15, wherein the first tooth portion faces the second tooth portion along the propagation direction in a facing area defined between another end of the first tooth portion and another end of the second tooth portion in a direction orthogonal to the propagation direction, and the plurality of perturbative weights is arranged in the facing area.

17. The yaw rate sensor of the surface acoustic wave according to claim 11, wherein the detecting unit has a first detecting electrode with a first tooth portion extending along a direction parallel to the driving axis and a second detecting electrode with a second tooth portion facing the first tooth portion, the first detecting electrode has a bus bar connected with an end of the first tooth portion, and the second detecting electrode has a bus bar connected with an end of the tooth portion which is placed on a side different from another side on which the end of the tooth portion is connected with the bus bar.

18. The yaw rate sensor of the surface acoustic wave according to claim 17, wherein the plurality of perturbative weights is arranged in an area placed between an extending line of the bus bar and an extending line of the bus bar while avoiding areas placed on the extending lines.

19. The yaw rate sensor of the surface acoustic wave according to claim 18, wherein the first tooth portion faces the second tooth portion along the propagation direction in a facing area defined between another end of the first tooth portion and another end of the second tooth portion in a direction orthogonal to the propagation direction, and the plurality of perturbative weights is arranged in the facing area.

20. The yaw rate sensor of the surface acoustic wave according to claim 1, wherein the exciting electrode has a first set of exciting electrodes and a second set of exciting electrodes, the sets of exciting electrodes are arranged line-symmetrically to each other with respect to the driving axis, the plurality of perturbative weights includes a first perturbative weight, located in the area in which the standing wave is generated by the first set of exciting electrodes and a second perturbative weight located in the area in which the standing wave is generated by the second set of exciting electrodes, and the detecting unit is located between the first perturbative weight and the second perturbative weight.

21. The yaw rate sensor of the surface acoustic wave according to claim 20, wherein the first set of exciting electrodes and the second set of exciting electrodes are, respectively, oscillated by phases opposite to each other.

22. The yaw rate sensor of the surface acoustic wave according to claim 20, wherein the detecting unit is line-symmetric with respect to the driving axis.

23. The yaw rate sensor of the surface acoustic wave according to claim 21, wherein the detecting unit is line-symmetric with respect to the driving axis.

* * * * *